US011093782B2

(12) United States Patent
Hu et al.

(10) Patent No.: US 11,093,782 B2
(45) Date of Patent: Aug. 17, 2021

(54) METHOD FOR MATCHING LICENSE PLATE NUMBER, AND METHOD AND ELECTRONIC DEVICE FOR MATCHING CHARACTER INFORMATION

(71) Applicant: HANGZHOU HIKVISION DIGITAL TECHNOLOGY CO., LTD., Zhejiang (CN)

(72) Inventors: Longsheng Hu, Hangzhou (CN); Zhiming Shen, Hangzhou (CN); Qingping Jiang, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 132 days.

(21) Appl. No.: 16/585,552

(22) Filed: Sep. 27, 2019

(65) Prior Publication Data
US 2020/0026946 A1 Jan. 23, 2020

Related U.S. Application Data

(63) Continuation of application No. PCT/CN2018/077882, filed on Mar. 2, 2018.

(30) Foreign Application Priority Data

Mar. 31, 2017 (CN) .......................... 201710208834.5

(51) Int. Cl.
*G06K 9/00* (2006.01)
*G06K 9/32* (2006.01)
(Continued)

(52) U.S. Cl.
CPC ............ *G06K 9/325* (2013.01); *G06F 16/24* (2019.01); *G06K 9/00087* (2013.01);
(Continued)

(58) Field of Classification Search
CPC .. G06K 9/325; G06K 9/00087; G06K 9/2054; G06K 9/34; G06K 2209/15;
(Continued)

(56) References Cited

U.S. PATENT DOCUMENTS 5,742,706 A * 4/1998 Yu .............................. G06F 7/02
382/229
5,907,852 A * 5/1999 Yamada ................ G06F 40/166
715/222
(Continued)

FOREIGN PATENT DOCUMENTS

CN 104375982 A * 2/2015
CN 104375982 A 2/2015
(Continued)

OTHER PUBLICATIONS

First office action of Chinese application No. 201710208834.5 dated May 21, 2020.
(Continued)

*Primary Examiner* — Mahendra R Patel
(74) *Attorney, Agent, or Firm* — Knobbe, Martens, Olson & Bear, LLP

(57) ABSTRACT

A method for matching a license plate number, comprises: obtaining a first license plate number to be matched; obtaining a license plate number library, wherein the license plate number library includes at least one second license plate number; calculating, based on a visual similarity of characters, a difficult degree in editing a character string required to converting between each second license plate number and the first license plate number; and determining, according to the difficult degree in editing a character string, at least one second license plate number matched with the first license plate number.

16 Claims, 6 Drawing Sheets

(51) Int. Cl.
*G06F 16/24* (2019.01)
*G06K 9/20* (2006.01)
*G06K 9/34* (2006.01)
*G08G 1/017* (2006.01)

(52) U.S. Cl.
CPC ............. *G06K 9/2054* (2013.01); *G06K 9/34* (2013.01); *G08G 1/017* (2013.01); *G06K 2209/15* (2013.01)

(58) Field of Classification Search
CPC .. G06K 9/6215; G06K 9/2072; G06K 9/6201; G06K 9/3258; G06K 2209/01; G06F 16/24; G06F 16/90344; G08G 1/017
USPC ........................................................ 382/105
See application file for complete search history.

(56) References Cited

U.S. PATENT DOCUMENTS

| | | | | | |
|---|---|---|---|---|---|
| 6,081,206 | A | * | 6/2000 | Kielland | G06Q 30/0284 194/902 |
| RE38,626 | E | * | 10/2004 | Kielland | G07B 15/02 194/902 |
| 7,283,999 | B1 | * | 10/2007 | Ramesh | G06F 16/2453 |
| 7,382,280 | B2 | * | 6/2008 | Long | G06Q 30/0284 235/384 |
| 8,391,559 | B2 | * | 3/2013 | Tsai | G06K 9/3258 382/105 |
| 8,447,112 | B2 | * | 5/2013 | Paul | G06K 9/00 382/182 |
| 8,781,172 | B2 | * | 7/2014 | Kozitsky | G06K 9/3258 382/105 |
| 9,224,058 | B2 | * | 12/2015 | Paul | G06K 9/2027 |
| 9,405,985 | B1 | * | 8/2016 | Burry | G06K 9/3258 |
| 9,785,855 | B2 | * | 10/2017 | Gordo Soldevila | G06K 9/4628 |
| 9,818,154 | B1 | * | 11/2017 | Wilbert | G06K 9/325 |
| 10,019,640 | B2 | * | 7/2018 | Almeida | G06K 9/325 |
| 2007/0179899 | A1 | * | 8/2007 | Hase | G06Q 10/10 705/59 |
| 2010/0023412 | A1 | * | 1/2010 | Kitagawa | G06Q 30/0601 705/26.1 |
| 2010/0189364 | A1 | * | 7/2010 | Tsai | G06K 9/3258 382/209 |
| 2012/0014612 | A1 | * | 1/2012 | Fujiwara | G06K 9/00483 382/218 |
| 2012/0197908 | A1 | * | 8/2012 | Unno | G06F 40/258 707/749 |
| 2012/0275653 | A1 | * | 11/2012 | Hsieh | G06K 9/325 382/105 |
| 2013/0060786 | A1 | * | 3/2013 | Serrano | G06K 9/3258 707/749 |

FOREIGN PATENT DOCUMENTS

| | | | | |
|---|---|---|---|---|
| CN | 104915644 | A | | 9/2015 |
| CN | 105608462 | A | | 5/2016 |
| CN | 106056919 | A | * | 10/2016 |
| CN | 106056919 | A | | 10/2016 |
| CN | 106127222 | A | * | 11/2016 |
| CN | 106127222 | A | | 11/2016 |
| CN | 106326896 | A | | 1/2017 |
| EP | 2595092 | A3 | * | 9/2014 ........... G06K 9/6255 |

OTHER PUBLICATIONS

Extended European search report of counterpart EP application No. 18777257.9 dated Mar. 4, 2020.
Ko et al., "License Plate Surveillance System Using Weighted Template Matching", Applied Imagery Pattern Recognition Workshop, 2003. Proceedings. 32nd Washington, DC, USA Oct. 15-17, 2003, Piscataway, NJ, USA, IEEE, Oct. 15, 2003 (Oct. 15, 2003), pp. 269-274.
Du et al., "Automatic License Plate Recognition (ALPR): A State-of-the-Art Review", IEEE Transactions on Circuits and Systems for Video Technology, Institute of Electrical and Electronics Engineers, US, vol. 23, No. 2, Feb. 1,2013 (Feb. 1, 2013), pp. 311-325.
International Search Report and Written Opinion in PCT application No. PCT/CN2018/077882 dated Jun. 4, 2018.

* cited by examiner

METHOD FOR MATCHING LICENSE PLATE NUMBER, AND METHOD AND ELECTRONIC DEVICE FOR MATCHING CHARACTER INFORMATION

CROSS-REFERENCE TO RELATED APPLICATION

This application is a continuation of International Application No. PCT/CN2018/077882, filed on Mar. 2, 2018, which claims the benefit of priority to Chinese Patent Application No. 201710208834.5, filed on Mar. 31, 2017 and entitled "METHOD AND DEVICE FOR MATCHING LICENSE PLATE NUMBER, AND METHOD AND DEVICE FOR MATCHING CHARACTER INFORMATION". Each of the above-recited applications is hereby incorporated herein by reference.

Any and all applications for which a foreign or domestic priority claim is identified in the Application Data Sheet as filed with the present application are hereby incorporated by reference in their entirety under 37 CFR 1.57.

TECHNICAL FIELD

The present disclosure relates to the field of an intelligent monitoring technology, and in particular to a method for matching a license plate number, and a method and electronic device for matching character information.

BACKGROUND

The intelligent monitoring technology is widely used in places, such as highways, residential areas and parking lots. An image captured by a monitoring device can effectively record behaviors of passing vehicles. Generally, each vehicle may be identified by a license plate number of the vehicle. In order to match a vehicle in the image with an actual vehicle, image recognition can be performed on the captured image to obtain the license plate number of the vehicle.

SUMMARY

Examples of the present disclosure provide a method for matching a license plate number, and a method and electronic device for matching character information. The technical solution comprise:

In a first aspect, there is provided a method for matching a license plate number, comprising:
obtaining a first license plate number to be matched;
obtaining a license plate number library, wherein the license plate number library includes at least one second license plate number;
calculating, based on a visual similarity of characters, a difficult degree in editing a character string required to converting between each second license plate number and the first license plate number; and
determining, according to the difficult degree in editing a character string, at least one second license plate number matched with the first license plate number.

In a second aspect, there is provided a method for matching character information, comprising:
obtaining a piece of first character information to be matched;
obtaining a character information library, wherein the character information library includes at least one piece of second character information;
calculating a difficult degree in editing a character string required to converting between each piece of second character information and the first character information based on the visual similarity of characters; and
determining at least one piece of second character information matched with the first character information according to the difficult degree in editing a character string.

In a third aspect, there is provided an electronic device, comprising: a processor and a memory, wherein the memory stores at least one instruction, and the at least one instruction is loaded and executed by the processor to implement the operation performed following acts:
obtaining a first license plate number to be matched;
obtaining a license plate number library, wherein the license plate number library includes at least one second license plate number;
calculating, based on visual similarity of characters, a difficult degree in editing a character string required to converting between each second license plate number and the first license plate number; and
determining, according to the difficult degree in editing a character string, at least one second license plate number matched with the first license plate number.

In a fourth aspect, there is provided an electronic device, comprising: a processor and a memory, wherein the memory stores at least one instruction, and the at least one instruction is loaded and executed by the processor to implement following acts:
obtaining a piece of first character information to be matched;
obtaining a character information library, wherein the character information library includes at least one piece of second character information;
calculating a difficult degree in editing a character string required to converting between each piece of second character information and the first character information based on visual similarity of characters; and
determining at least one piece of second character information matched with the first character information according to the difficult degree in editing a character string.

In a fifth aspect, there is provided computer-readable storage medium, wherein the computer-readable storage medium stores at least one instruction, and the at least one instruction is loaded and executed by a processor to implement following acts:
obtaining a first license plate number to be matched;
obtaining a license plate number library, wherein the license plate number library includes at least one second license plate number;
calculating, based on visual similarity of characters, a difficult degree in editing a character string required to converting between each second license plate number and the first license plate number; and
determining, according to the difficult degree in editing a character string, at least one second license plate number matched with the first license plate number.

In a sixth aspect, there is provided computer-readable storage medium, wherein the computer-readable storage medium stores at least one instruction, and the at least one instruction is loaded and executed by a processor to implement following acts:
obtaining a piece of first character information to be matched;
obtaining a character information library, wherein the character information library includes at least one piece of second character information;

calculating a difficult degree in editing a character string required to convening between each piece of second character information and the first character information based on visual similarity of characters; and determining at least one piece of second character information matched with the first character information according to the difficult degree in editing a character string.

BRIEF DESCRIPTION OF THE DRAWINGS

In order to describe the technical solutions in the examples of the present more clearly, the following briefly introduces the accompanying drawings required to describing the examples. Apparently, the accompanying drawings in the following description show merely some examples of the present disclosure, and a person of ordinary skill in the art may understand the present disclosures and drawings to encompass additional subject matter and fall within the scope of the present disclosure.

DETAILED DESCRIPTION

The examples of the present disclosure will be described in further detail with reference to the accompanying drawings, to present the objects, technical solutions, and advantages of the present disclosure more clearly.

The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

Figure 1A:
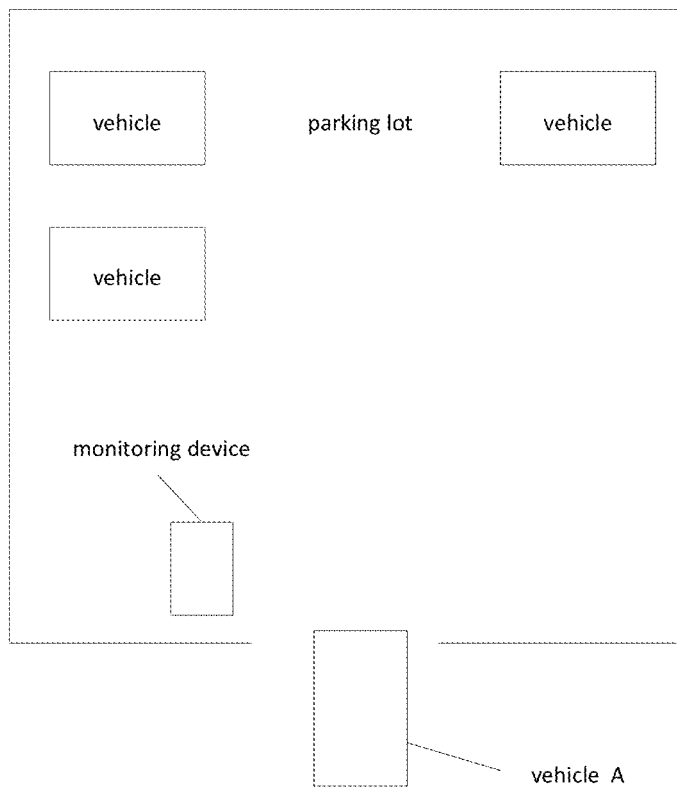
FIG. 1A is a schematic diagram of a parking billing scenario according to examples of the present disclosure.

Nowadays, the license plate number of the vehicle is used repeatedly in many scenarios to record the behavior of a vehicle by matching the license plate number. By taking the parking billing scenario as an example, referring to FIG. 1A, the monitoring device may obtain the license plate number of each vehicle entering the parking lot, and correspondingly store the license plate number of each vehicle and the entry time of the vehicle entering the parking lot. When an vehicle A leaves the parking lot, the monitoring device may obtain the license plate number of the vehicle A, and match the license plate number same as that of the vehicle A in the stored license plate numbers, thereby obtaining the parking duration and the parking fee of the vehicle A based on the time when the vehicle A leaves the parking lot and the entry time corresponding to the matched license plate number.

In the process of implementing the present disclosure, the inventors have found that the prior art has at least the following problems:

In an actual scenario, due to factors such as a shooting angle, shooting light, a license plate position or stains on the license plate, when the image recognition is performed on different images of the same vehicle captured by the monitoring device, the obtained license plate number may be different. For example, when the vehicle enters the parking lot, the obtained license plate number is A000, and when the vehicle leaves the parking lot, the obtained license plate number is AOOO, which results in the failure of matching the same license plate number as AOOO. As a result, the monitoring device cannot charge for the vehicle, and the monitoring function is failed. Therefore, there is an urgent need for a more reasonable method for matching the license plate number.

Figure 1B:
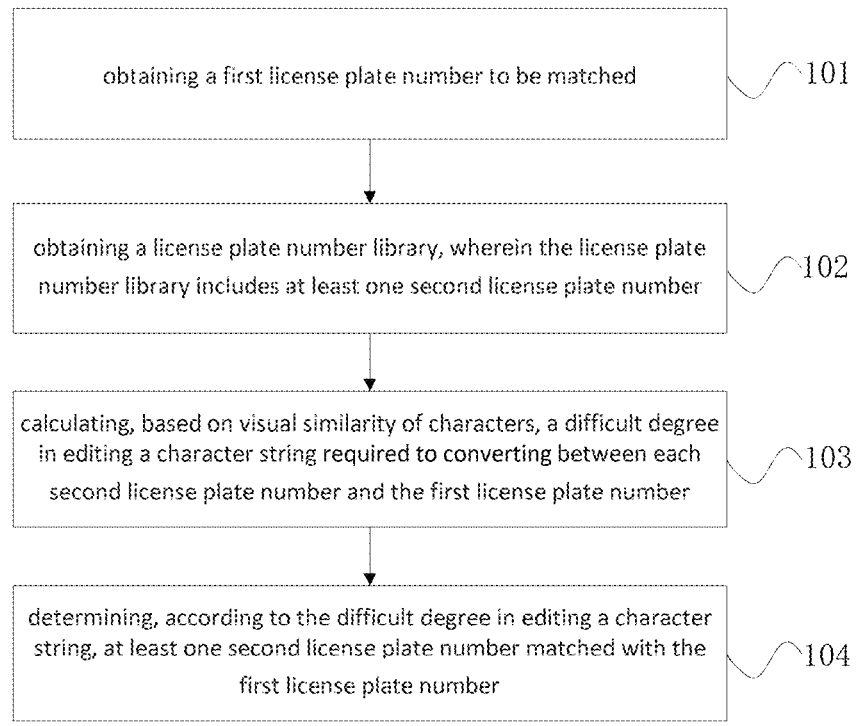
FIG. 1B is a flowchart of a method for matching a license plate number according to examples of the present disclosure.

FIG. 1B is a flowchart of a method for matching a license plate number according to examples of the present disclosure. Referring to FIG. 1B, the method includes:

101, obtaining a first license plate number to be matched;

102, obtaining a license plate number library, wherein the license plate number library includes at least one second license plate number;

103, calculating, based on a visual similarity of characters, a difficult degree in editing a character string required to converting between each second license plate number and the first license plate number; and 104, determining, according to the difficult degree in editing a character string, at least one second license plate number matched with the first license plate number.

In examples of the present disclosure, the first license plate number is obtained, and then a difficult degree in editing a character string required to converting between each second license plate number and the first license plate number is calculated according to the visual similarity of characters, thereby obtaining a license plate number matched with the first license plate number according to the difficult degree in editing a character string. Due to the image recognition error of the monitoring device, the manual input error of the license plate number, or the like, the wrong license plate number is very visually similar to the original license plate number, therefor the difficult degree in editing a character string obtained according to the visual similarity of characters may reasonably evaluate the similarity between the second license plate number and the first license number. Even if a license plate number recognized is wrong, a license plate number corresponding to the same vehicle may still be obtained successfully, thereby ensuring the effectiveness and rationality of the monitoring function.

In an optional implementing manner, wherein the calculating the difficult degree in editing a character string required to converting between each second license plate number and the first license plate number based on the visual similarity of characters, comprises:

calculating, according to the visual similarity of characters, a difficult degree in editing a character required to convening between each character in each second license plate number and a corresponding character in the first license plate number; and calculating, according to difficult degrees in editing all characters in the second license plate number, a difficult degree in editing a character string required to converting between a second license plate number and the first license plate number.

In an optional implementing manner, the difficult degree in editing a character is a difficult degree in converting a character in the second license plate number into a corresponding character in the first license plate number.

In an optional implementing manner, wherein the calculating the difficult degree in editing a character string required to convening between a second license plate number and the first license plate number according to all difficult degrees in editing a character corresponding to all characters in the first license plate number, comprises:

summing difficult degrees in editing all characters in the second license plate number, and taking the sum as the difficult degree in editing a character string.

In an optional implementing manner, wherein the calculating a difficult degree in editing a character required to converting between each character in each second license plate number and a corresponding character in the first license plate number according to the visual similarity of characters, comprises:

obtaining the visual similarity between each character in the second license plate number and the corresponding character in the first license plate number; and calculating the difficult degree in editing a character required to convening between each character in the second license plate number and the corresponding character in the first license plate number, wherein the difficult degree in editing a character and the obtained visual similarity of characters being the relationship of inverse proportion.

In an optional implementing manner, prior to the calculating the difficult degree in editing a character string required to convening between a second license plate number and the first license plate number, the method further comprising:

determining a plurality of similar characters corresponding to each target character, and forming a similar character set of the target character by sorting in a sequence in descending order according to the visual similarity between each of the plurality of similar characters and the target character;

wherein the obtaining the visual similarity between each character in the second license plate number and the corresponding character in the first license plate number, comprises:

determining the visual similarity between the character in the second license plate number and the corresponding character in the first license plate number as zero, if the corresponding character in the first license plate number is not in the similar character set corresponding to the character in the second license plate number; and determining the visual similarity between the character in the second license plate number and the corresponding character in the first license plate number according to the sorted order of the corresponding character in the first license plate number in the similar character set, if the corresponding character in the first license plate number is in the similar character set corresponding to the character in the second license plate number.

In an optional implementing manner, wherein the obtaining the visual similarity between each character in the second license plate number and the corresponding character in the first license plate number, includes:

determining the visual similarity between the character in the second license plate number and the corresponding character in the first license plate number as zero, if the character in the second license plate number has no corresponding similar character set.

In an optional implementing manner, all similar characters are sorted in a sequence in descending order according to the visual similarity between a similar character and the target character;

wherein the determining the visual similarity between the character in the second license plate number and the corresponding character in the first license plate number according to the sorted order of the corresponding character in the first license plate number in the similar character set, comprises:

obtaining a sequencing number of the corresponding character in the first license plate number in the similar character set;

calculating the visual similarity between the character in the second license plate number and the corresponding character in the first license plate number by Formula 1:

$$\lambda_1 = \frac{n_1 - k_1 + 1}{n_1}, 1 \leq k_1, \qquad \text{Formula 1}$$

wherein, $\lambda_1$ is the visual similarity between the character in the second license plate number and the corresponding character in the first license plate number, $n_1$ is the number of characters in the similar character set, and $k_1$ is the sequencing number of the corresponding character in the first license plate number in the similar character set.

In an optional implementing manner, wherein the obtaining a license plate number library, comprises:

searching in a plurality of license plate numbers based on at least one character in the first license plate number; and if a license plate number of the plurality of license plate numbers includes a character the same as the at least one character in the first license plate number, then determining the license plate number as a second license plate number in the license plate number library In an optional implementing manner, wherein the obtaining a license plate number library, includes:

searching in the plurality of license plate numbers based on at least two consecutive characters in the first license plate number; and if a license plate number of the plurality of license plate numbers includes at least two consecutive characters the same as the at least two consecutive characters in the first license plate number, then determining the license plate number as a second license plate number in the license plate number library.

wherein the obtaining the first license plate number to be matched, comprises:

obtaining the first license plate number by performing image recognition on a captured image; or obtaining a first license plate number inputted manually.

In an optional implementing manner, wherein the determining at least one second license plate number as a license plate number matched with the first license plate number based on the difficult degree in editing a character string, includes:

determining a second license plate number, of which the difficult degree in editing a character string is zero, as a license plate number matched with the first license plate number; or if no second license plate number of which the difficult degree in editing a character string is zero, and the number of designated second license plate numbers, of which the difficult degree in editing a character string is less than a preset threshold, is one, then determining the designated second license plate number as the license plate number matched with the first license plate number; or, if no second license plate number of which the difficult degree in editing a character string is zero, and the number of designated second license plate numbers, of which the difficult degree in editing a character string is less than a preset threshold, is more than one, then prompting to select one license plate number from the plurality of designated second license plate numbers; and when the selection of a designated second license plate number is received, determining the selected designated second license plate number as the license plate number matched with the first license plate number; or, if no second license plate number of which the difficult degree in editing a character string is zero, sorting the second license plate number in a sequence in ascending order according to the difficult degree in editing a character string of each second license plate number, and outputting the preset number of second license plate numbers at the top of a second license plate number sequence as the license plate number matched with the first license plate number.

All of the above optional manners may be applied in any combination to form optional examples of the present disclosure, and will not be further repeated herein.

Figure 2:
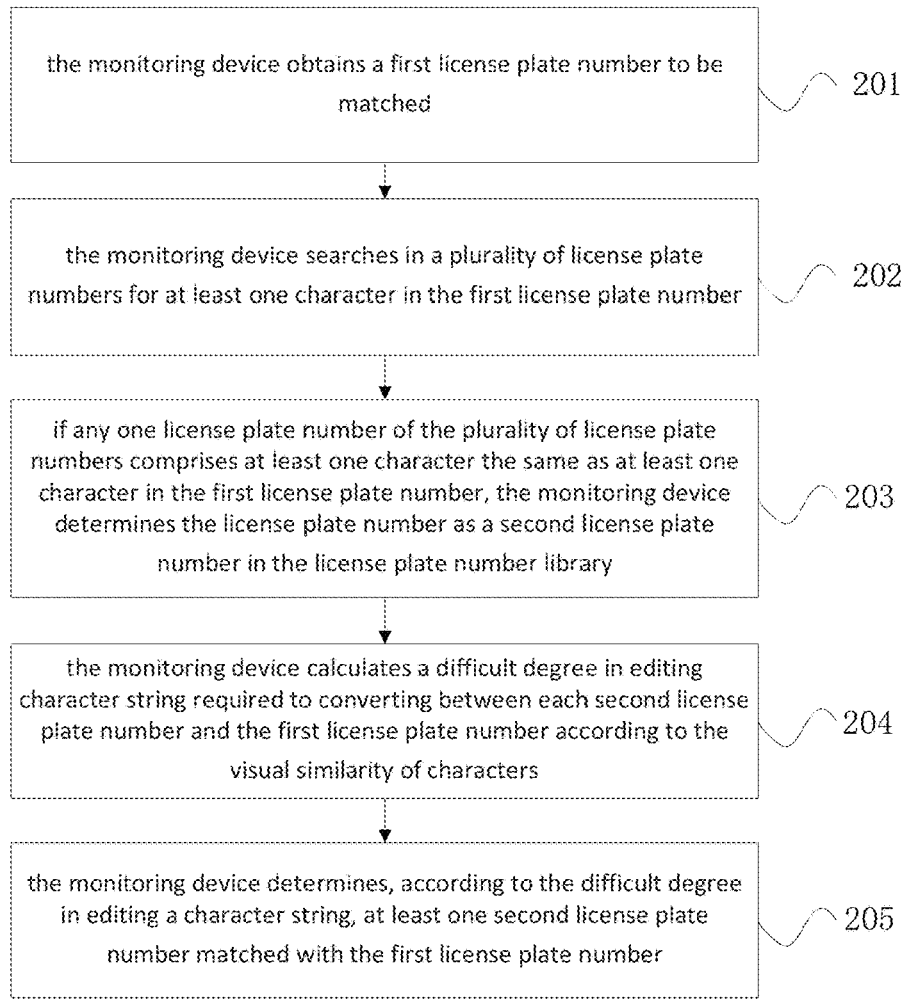
FIG. 2 is a flowchart of a method for matching a license plate number according to examples of the present disclosure.

FIG. 2 is a flowchart of a method for matching a license plate number according to examples of the present disclosure. Referring to FIG. 2, the method can be applied to any electronic device, such as a monitoring device, a terminal, or a server. In addition, the method can be applied to various scenarios. For example, in the scenario such as parking billing, searching a violating vehicle, or searching an accident vehicle, a license plate number which is similar to the license plate number to be matched can be determined based on the method. For example, the electronic device is a monitoring device, and the method may include the following steps.

201, the monitoring device obtains a first license plate number to be matched.

The first license plate number may be a license plate number of a vehicle. The manner for obtaining the first license plate number is not specifically limited in 1 examples of the present disclosure. For example, the monitoring device may adopt any one of the following two obtaining manners.

In an obtaining manner 1, the monitoring device may obtain the first license plate number by performing image recognition on a captured image.

In the obtaining manner 1, when the monitoring device detects that a vehicle enters an image capturing region based on the manner such as infrared detection or image detection, then an area that the license plate number located in the captured image may be determined based on the distribution of pixel points in the captured image. Then a set of characters on the license plate number is recognized based on the distribution of the pixel points in the area, thereby the set of characters may be determined as the first license plate number.

In an obtaining manner 2, the monitoring device may obtain the first license plate number inputted manually.

The monitoring device may also provide an input interface, so that the monitoring device may obtain the first license plate number inputted manually through the input interface.

It should be noted that when the method for matching a license plate number is applied to the terminal, the terminal may obtain the first license plate number based on any one of the two obtaining manners above mentioned. When the method for matching a license plate number is applied to a server, the server may obtain the first license plate number from the monitoring device or the terminal via the network, wherein the first license plate number is obtained by the monitoring device or the terminal based on any one of the two obtaining manners above mentioned.

202, the monitoring device searches in a plurality of license plate numbers based on at least one character in the first license plate number.

Each of the plurality of license plate numbers may be a license plate number of a vehicle. The source of the plurality of license plate numbers does not limit in examples of the present disclosure. For example, in the scenario of parking billing, the plurality of license plate numbers may be the license plate numbers of vehicles entering the parking lot. For another example, in the scenario of searching a violating vehicle, the plurality of license plate numbers may also be license plate numbers stored in a vehicle registration database, and the monitoring device may obtain the license plate numbers in the vehicle registration database via the network. The vehicle registration database refers to a database for registering vehicle information by the transportation department, and can be configured to store the license plate numbers of national (or local) vehicles.

In such step, in order to filter out the license plate numbers irrelevant to the first license plate number, thereby reducing the computation load for the subsequent calculation for the visual similarity of characters, and economizing the computing resources of the monitoring device. The monitoring device may extract at least one character in the first license plate number, and then search in the plurality of license plate numbers based on at least one character in the first license plate number to determine whether the plurality of license plate numbers comprises a character the same as the at least one character. If yes, step 203 is performed, if not, the license plate number is ignored, and the searching process is continued until all the plurality of license plate numbers are searched. The manner in which at least one character is extracted is not limited in examples of the present disclosure. For example, at least one consecutive is extracted, by the monitoring device, character from the first license plate number in character order. For another example, all the first characters in the first license plate number are sorted, by the monitoring device, and combined to obtain at least one character of multiple combinations.

In the above searching process, the specific searching manner is not limited in examples of the present disclosure. For example, the monitoring device forms a regular expression of the at least one character, and then searches in the plurality of license plate numbers for a license plate number which matches the regular expression.

Of course, in order to avoid the missing of the license plate number related to the first license plate number, and cause the searching process to be more comprehensive, the monitoring device may also extract multiple sets of at least one character and complete multiple rounds of searching based on each set of at least one character. For example, the first license plate number is "A1000", and the plurality of sets of at least one character that can be extracted by the monitoring device is: A, 1, 10, and 0.

203, if any one license plate number of the plurality of license plate numbers comprises at least one character the same as at least one character in the first license plate number, the monitoring device determines the license plate number as a second license plate number in the license plate number library.

The license plate number library comprises a plurality of second license plate numbers, and the second license plate number refers to a license plate number to be calculated the visual similarity between the license plate number and the first license plate number. Based on the searching process in step 202, the monitoring device may determine a license plate number, which includes at least one character the same as at least one character of the first license plate number, as the second license plate number.

In step 202, the monitoring device extracts a plurality of groups, each group includes at least one character. The monitoring device searches in the plurality of license plate numbers based on at least one character of each group, the step may include: if any one license plate number of the plurality of license plate numbers includes at least one character which is the same as at least one character of a group, the license plate number may be determined as the second license plate number in the license plate number library.

It should be noted that in order to further enhance the searching efficiency, the above steps 202 and 203 may specifically include: the monitoring device searches in the plurality of license plate numbers based on at least two consecutive characters in the first license plate number. If a license plate number of the plurality of license plate numbers includes at least two consecutive characters are the same as at least two consecutive characters in the first license plate number, such license plate number may be determined as the second license plate number in the license plate number library.

In a specific process, "123ADB" is taken as an example of the first license plate number, and at least two consecutive characters extracted may be: 12, 23, 3A, AD, and DB. The license plate number library that the monitoring device obtained may include a plurality of second license plate numbers: 12GGH, WEAD6, 453ADH and ADB346.

Since both the second license plate number and the first license plate number include at least one relative character, the hit rate of matching the second license plate number and the first license plate number is increased, thereby reducing the invalid computation load for a calculation for the visual similarity of characters, and economizing the computing resources of the monitoring device.

It should be noted that the above steps 202 and 203 are optional steps according to examples of the present disclosure. In fact, the examples of the present disclosure may also obtain the license plate number library without the searching process, and a plurality of license plate numbers stored in a certain device or a database (for example, the monitoring device or the vehicle registration database) may be determined as the second license plate number in the license plate number library, then following steps may be performed, and according to the subsequent matching process, a method for matching a license plate number is provided.

204, the monitoring device calculates a difficult degree in editing character string required to converting between each second license plate number and the first license plate number according to the visual similarity of characters.

The difficult degree in editing character string is a difficult degree for a conversion between a second license plate number and the first license plate number. In examples of calculation process, the difficult degree in editing character string may be the difficult degree for converting the second license plate number into the first license plate number, or the difficult degree of converting the first license plate number into the second license plate number. By taking the conversion of the second license plate number to the first license plate number as an example, the calculation process may include steps 2041-2042.

2041, the monitoring device calculates, according to the visual similarity of characters, the difficult degree in editing a character required to converting between each character in each second license plate number and a corresponding character in the first license plate number.

Wherein, the difficult degree in editing a character is a difficult degree for converting a character in the second license plate number into a corresponding character in the first license plate number. The specific process of the calculation may comprise: the monitoring device obtains the visual similarity between each character in the second license plate number and the corresponding character in the first license plate number, and calculates the difficult degree in editing a character required to converting between each character in the second license plate number and the corresponding character in the first license plate number according to the obtained visual similarity of characters. Wherein the difficult degree in editing a character is in an inverse ratio to the obtained visual similarity of characters.

The difficult degree in editing a character is in an inverse ratio to the obtained visual similarity of characters. It means that the higher the visual similarity of characters is, the lower the difficult degree in editing a character is. Examples of the present disclosure do not specifically limit the corresponding character in the first license plate number. For example, the corresponding character in the first license plate number means characters in the first license plate number and the characters in the second license plate number are characters with a corresponding position, after the same characters in the second license plate number and the first license plate number are aligned according to a character order. Taking an example that the second license plate number is 123456 and the first license plate number is 1237, after 123 are aligned, 4 may correspond to 7, and 5 and 6 may respectively correspond to a null character.

The manner in which the visual similarity of characters is obtained is not limited in examples of the present disclosure. For example, the monitoring device searches, according to a character in the second license plate number and the corresponding character in the first license plate number, in a configured visual similarity of characters for the visual similarity between the character in the second license plate number and the corresponding character in the first license plate number, and the configured visual similarity of characters is as shown in Table 1:

TABLE 1

| Character | Corresponding character | Visual similarity of characters. |
|---|---|---|
| 1 | 5 | 0.2 |
| 2 | 3 | 0.5 |
| 8 | 0 | 0.7 |
| 6 | 8 | 0.8 |

In addition, the visual similarity between any character and the null character may be 0 by default, and the visual similarity between the same characters may be 1 by default. If the visual similarity between the character in the second license plate number and the corresponding character in the first license plate number is not found in the configured visual similarity of characters, the monitoring device may determine the defaulted visual similarity of characters as the visual similarity between the character in the second license plate number and the corresponding character in the first license plate number, and the defaulted visual similarity of characters is, for example, 0.5.

In examples of the disclosure, the visual similarity of characters may also be obtained by the following steps (1)-(5):

(1) The monitoring device determines a plurality of similar characters corresponding to each target character, and the plurality of similar characters are sorted in a sequence in descending order according to the visual similarity between a similar character and the target character to form a similar character set of the target character.

The target character is a character with a configured similar character. The plurality of similar characters may be sorted in a sequence in descending order according to the visual similarity of characters, and may also be sorted in a sequence in ascending order according to the visual similarity of characters. By taking the descending order as an example, a similar character set of "0" may be {0, O, Q, G, B, P}, a similar character set of "B" may be {B, P, O, 0}, so the "0" or "B" is the target character. It should be noted that the monitoring device may provide a manual operation interface, so that the above similar character set can be manually updated, added or deleted at any time.

(2) The monitoring device determines whether a character in the second license plate number has a corresponding similar character set; If not, step (3) is performed, and if yes, the monitoring device may further determine whether the first license plate number includes a character the same as a character in the second license plate number; If not, step (4) is performed, and if yes, step (5) is performed.

In the judging process, the monitoring device may compare each character in the second license plate number with the target character respectively. If all characters in the second license plate number are not the same as the target character, it is determined that all characters in the second license plate number have no corresponding similar character set. If a character in the second license plate number is the same as a certain target character, then the monitoring device may determine whether a corresponding character in the first license plate number is in a similar character set corresponding to the target character. If yes, step (5) is performed and if no, step (4) is performed.

(3) If the characters in the second license plate number have no corresponding similar character set, the visual similarity between the character in the second license plate number and the corresponding character in the first license plate number may be determined, by the monitoring device, as zero.

If the characters in the second license plate number have no corresponding similar character set, it means that all the characters in the second license plate number may not be similar to any character, so the visual similarity between the character in the second license plate number and the corresponding character in the first license plate number may be determined, by the monitoring device, as zero.

(4) If the corresponding character in the first license plate number is not in the similar character set corresponding to the character in the second license plate number, then the visual similarity between the character in the second license plate number and the corresponding character in the first license plate number may be determined, by the monitoring device, as zero.

If the corresponding character in the first license plate number is not in the similar character set corresponding to the character in the second license plate number, it means that the character in the second license plate number may be dissimilar to the corresponding character in the first license plate number, then the visual similarity between the two may be determined, by the monitoring device, as zero.

(5) If the corresponding character in the first license plate number is in the similar character set corresponding to the character in the second license plate number, the visual similarity between the character in the second license plate number and the corresponding character in the first license plate number may be determined, by the monitoring device, according to the sequencing of the corresponding characters in the first license plate number in the similar character set.

The specific determining manner does not limited in examples of the present disclosure. For example, the characters in the similar character set are sorted in a sequence in descending order according to the visual similarity between the characters in the similar character set and the target character, the specific manner of determining the visual similarity of characters by the monitoring device may be: the monitoring device obtains the sequencing number of a corresponding character in the first license plate number in the similar character set. Formula 1 is applied to calculate the visual similarity between the character in the second license plate number and the corresponding character in the first license plate number:

$$\lambda_1 = \frac{n_1 - k_1 + 1}{n_1}, 1 \le k_1,\qquad \text{Formula 1}$$

wherein $\lambda_1$ is the visual similarity between the character in the second license plate number and the corresponding character in the first license plate number, $n_1$ is the number of the characters in the similar character set corresponding to the character in the second license plate number, and $k_1$ is the sequencing number of the corresponding character in the first license plate number in the similar character set.

By combining Table 1 and Formula 1, it is assumed that the character in the second license plate number is "0", then the visual similarity of characters with the corresponding characters 0, O, Q, G, B, and P in the first license plate number is as shown in Table 2,

TABLE 2

| Character | Similar character | λ |
|---|---|---|
| 0 | 0 | 6/6 |
| 0 | O | 5/6 |
| 0 | Q | 4/6 |
| 0 | G | 3/6 |
| 0 | B | 2/6 |
| 0 | P | 1/6 |

It is assumed that the character in the second license plate number is "B", the visual similarity of characters with the corresponding characters 0, O, Q, G, B, and P in the first license plate number is as shown in Table 3.

TABLE 3

| Character | Similar character | λ |
|---|---|---|
| B | B | 4/4 |
| B | P | 3/4 |
| B | O | 2/4 |
| B | 0 | 1/4 |

After the visual similarity of characters between the character in the second license plate number and the corresponding character in the first license plate number is obtained based on any of the above manners, the monitoring device can calculate the difficult degree in editing a character between the character in the second license plate number and the corresponding character in the first license plate number. The specific calculating manner is not limited in examples of the present disclosure. For example, $X=1*(1-\lambda_1)$, wherein, X refers to the difficult degree in editing a character between the character in the second license plate number and the corresponding character in the first license plate number, and 1 refers to the single operation of converting the character in the second license plate number into the corresponding character in the first license plate number, and $\lambda_1$ refers to the visual similarity of characters between the character in the second license plate number and the corresponding character in the first license plate number.

2042, the monitoring device calculates, according to the difficult degrees in editing a of character editing required to converting between all characters in the second license plate number and the corresponding characters in the first license plate number, the difficult degree in editing a character string required to conversion between the second license plate number and the first license plate number.

In such step, the manner for calculating the difficult degree in editing a character string is not specifically limited in examples of the present disclosure. For example, the difficult degrees in editing character between all characters in the second license plate number and the corresponding characters in the first license plate number are added together, and the sum from adding the difficult degrees of character editing is the difficult degree in editing a character string required to converting between the second license plate number and the first license plate number. Of course, during the adding, the monitoring device may adopt the weight of each difficult degree in editing a character of each character in the second license plate number. Correspondingly, the step 2042 may be: the monitoring device performs weighted summating to all difficult degrees of character editing between each character in the second license plate number and the corresponding characters in the first license plate number, and the weighted summation is the difficult degrees of character string editing required to conversion between the second license plate number and the first license plate number.

The weight of the each difficult degree in editing a character of each character in the second license plate number may be an arbitrary value. By combining the visual similarity of characters of Table 2 and Table 3, the condition that the weight of the difficult degree in editing a character of each character is 1, the first license plate number is AQB00R, and the second license plate number is AQ000R, AQBBBR, AQ0BBR, AQ0BBB, AOBO0R, BQB00R and AQBGBG respectively is taken as an example for illustration, and the calculating process and the obtained difficult degree in editing a character string are as shown in Table 4.

TABLE 4

| First license plate number | Second license plate number | Calculating process | Difficult degree in editing a character string |
|---|---|---|---|
| AQB00R | AQ000R | The third 0 is converted to B, | 3/4 = 0.75 |
| | AQBBBR | The fourth B is converted to 0, the fifth B is converted to 0 | 3/4 + 3/4 = 1.5 |
| | AQ0BBR | The third 0 is converted to B, the fourth B is converted to 0, the fifth B is converted to 0 | 4/6 + 3/4 + 3/4 = 2.16 |
| | AQ0BBB | The third 0 is converted to B, the fourth B is converted to 0, the fifth B is converted to 0, the sixth B is converted to R | 4/6 + 3/4 + 3/4 + 1 = 3.16 |
| | AOBO0R | The second O is substituted with Q, the fourth O is substituted with 0 | 1 + 1 = 2 |
| | BQB00R | The first B is substituted with A | 1 |
| | AQBGBG | The fifth B is substituted with 0 | 1 + 3/4 = 1.75 |

It should be noted that the above steps 2041-2042 are an optional manner to calculate the difficult degree in editing a character string. In fact, the monitoring device may also calculate the difficult degree in editing a character string based on the configured calculation formula and the visual similarity of characters. The specific calculation formula is not limited in the embodiment of the present disclosure. The calculation formula is as shown in Formula 3, $$D(i, j) = \min \begin{cases} D(i-1, j) + Del(s_i) \\ D(i, j-1) + Ins(t_j) \\ D(i-1, j-1) + (1-\lambda)Sub(s_i, t_j) \end{cases} \quad \text{Formula 3}$$

wherein $$Del(s_i) = Ins(t_j) = 1$$

$$Sub(s_i, t_j) = \begin{cases} 1, (s_i \neq t_j) \\ 0, (s_i = t_j) \end{cases}.$$

Wherein, i is a sequencing number of a character in the second license plate number, j is a sequencing number of a character in the first license plate number, both the i and j are positive integers, i is less than or equal to the number of characters in the second license plate number, j is less than or equal to the number of characters in the first license plate number, $s_i$ refers to the i-th character in the second license plate number, $t_j$ refers to the j-th character in the first license plate number, and $\lambda_1$ refers to the visual similarity between $s_i$ and $t_j$. $Del(s_i)$ refers to the difficult degree in editing a character for converting the i-th character of the second license plate number to the corresponding null character in the first license plate number, $Ins(t_j)$ refers to the difficult degree in editing a character of converting the null character in the second license plate number to the corresponding $t_j$ character in the first license plate number. $Sub(s_i, t_j)$ refers to the a single conversion from $s_i$ to $t_j$, and $(1-\lambda) Sub(s_i, t_j)$ refers to the difficult degree in editing a character for convening $s_i$ in the second license plate number to the $t_j$ character in the first license plate number. D(i,j) refers to the difficult degree in editing a character string for convening the first i characters in the second license plate number into the first j characters in the first license plate number, D(i−1,j) refers to the difficult degree in editing a character string for converting the first i−1 characters in the second license plate number to the first j characters in the first license plate number, D(i, j−1) refers to the difficult degree in editing a character string for converting the first i characters in the second license plate number to the first j−1 characters in the first license plate number, and D(i−1, j−1) refers to the difficult degree in editing a character string for converting the first i−1 characters in the second license plate number to the first j−1 characters in the first license plate number.

Based on Formula 3, the monitoring device can gradually obtain the difficult degree in editing a character string for converting the first i characters in the second license plate number to the first j characters in the first license plate number according to the recursive relationship of Formula 3, and finally obtain the difficult degree in editing a character string for converting the second license plate number to the first license plate number.

205, the monitoring device determines, according to the difficult degree in editing a character string, at least one second license plate number matched with the first license plate number.

The monitoring device determines, according to the difficult degree in editing a character string required to converting between each second license plate number and the first license plate number, at least a license plate number in the license plate number library as the second license plate number. Wherein, the greater the visual similarity of characters is, the smaller the difficult degree in editing a character is, and the smaller the difficult degree in editing a character string is, which means that the second license plate number is more similar to and more matched with the first license plate number. Based on the above matching principle, the specific manner of determining the matched license plate number is not further limited in examples of the present disclosure. For example, the monitoring device can determine the matched second license plate number by the following steps 1-4.

1. The monitoring device determines the second license plate number, of which the difficult degree in editing a character string is zero, as the license plate number matched with the first license plate number.

In such step, the monitoring device can judge whether the second license plate number of which the difficult degree in editing a character string required to converting between each second license plate number and the first license plate number is zero exists in the license plate number library. If yes, it means that the second license plate number same as the first license plate number exists in the license plate number library, and the second license plate number is directly determined as the license plate number matched with the first license plate number. If no, step 2 or 4 can be performed.

2. If the second license plate number of which the difficult degree in editing a character string required to converting between each second license plate number and the first license plate number is zero does not exist in the license plate number library, and the number of the designated second license plate number of which the difficult degree in editing a character string is less than a preset threshold is one, the one designated second license plate number is determined as the license plate number matched with the first license plate number.

In such step, the monitoring device can compare the difficult degree in editing a character string required to converting between each second license plate number and the first license plate number with the preset threshold, and determine the second license plate number of which the difficult degree in editing a character string is less than the preset threshold as the designated license plate number. Further, the monitoring device may determine the number of the designated second license plate number. If the number of the designated second license plate number is one, it means that the one license plate number meets the matching requirements, and the one designated license plate number may be determined as the license plate number matched with the first license plate number. If the number of the designated second license plate numbers is plural, step 3 can be performed. Referring to Table 4, by taking 1 as an example of the preset threshold, the monitoring device can determine the second license plate number AQ00R of which the difficult degree in editing a character string required to converting between each second license plate number and the first license plate number is less than 1 as the license plate number matched with the first license plate number.

3. If no second license plate number of which the difficult degree in editing a character string required to converting between each second license plate number and the first license plate number is zero exists in the license plate number library, and the number of the designated second license plate numbers of which the difficult degree in editing a character string is less than the preset threshold is more than 1, then provide a prompt for selecting a license plate number from the plurality of designated second license plate numbers. When a selection to any one designated second license plate number of the plurality of designated second license plate numbers is received, the selected designated second license plate number is determined as the license plate number matched with the first license plate number.

In such step, since the plurality of designated second license plate numbers meet the preset threshold of the matching requirement, the prompt may be performed to manually select the matched license plate number, and when the selecting operation for any designated second license plate number is received, the designated second license plate number may be determined as the license plate number matched with the first license plate number. Of course, the monitoring device may also receive an abandoning operation. At this point, the monitoring device can determine that the match is failed. In the step, at least one designated second license plate number which may be matched with the first license plate number is automatically and intelligently determined by a device firstly, and the second license plate number matched with the first license plate number is than to be selected manually. By the combined matching manner of the device and a person, the matching manner is more humanized, and the matching efficiency is improved compared with the full manual matching manner.

4. If no second license plate number, of which the difficult degree in editing a character string required to converting between each second license plate number and the first license plate number is zero, exists in the license plate number library, the second license plate number sequenced in the front preset number is output by the monitoring device as the license plate number matched with the first license plate number according to the sequence of the difficult degree in editing a character string in ascending order.

In such step, a preset number of license plate numbers most similar to the first license plate number may be selected from the plurality of second license plate numbers, so that the matching result can be obtained in each matching.

Figure 3:
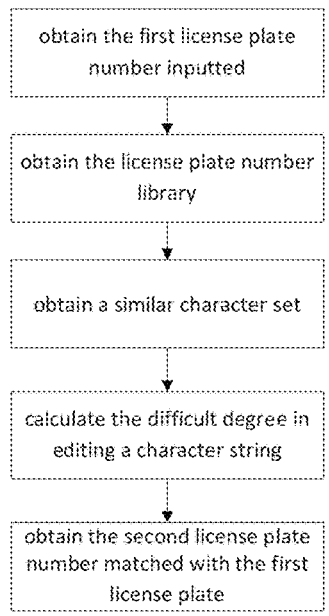
FIG. 3 is a flowchart of matching a license plate number according to examples of the present disclosure.

Based on the matching process for the license plate number of FIG. 2, referring to FIG. 3, the examples of the present disclosure provides a flowchart for matching a license plate number. In the flowchart, the monitoring device (or the server, the terminal, etc.) can obtain the first license plate number inputted manually, and search in the vehicle registration database, and then obtain a license plate number including at least two consecutive characters the same as the corresponding characters in the first license plate number, thereby obtaining the license plate number library. Further, the monitoring device can obtain the configured similar character set of the target character, calculate to obtain the difficult degree in editing a character string, and obtain the license plate number matched with the first license plate number according to the difficult degree in editing a character string.

According to examples of the present disclosure, the first license plate number is obtained, and the difficult degree in editing a character string required to convening between each second license plate number and the first license plate number according to the visual similarity, thereby obtaining the license plate number matched with the first license plate number according to the difficult degree in editing a character string. Due to the image recognition error of the monitoring device, the manual input error of the license plate number, or the like, the license plate number matched by mistake is very visually similar to the original license plate number, so that based on the difficult degree in editing a character string obtained by the visual similarity, the similarity between the second license plate number and the first license plate number can be reasonably evaluated. Even if the license plate number matched is incorrect, the vehicle still could be identified successfully by the matched license plate number, thereby ensuring the effectiveness and rationality of the monitoring function.

In addition, based on the principle that the difficult degree in editing a character and the visual similarity of characters are in the relationship of inverse proportion, the difficult degree in editing a character can be calculated based on the visual similarity, and the difficult degree in editing a character string can be obtained by summing all difficult degrees in editing a character corresponding to all characters in the string, thereby providing a specific method to calculate the difficult degree in editing a character string.

In addition, the specific solution of obtaining the visual similarity of characters is provided, for the case where the similar character set is not configured for the character in the second license plate number, or the corresponding character in the first license plate number is not in the similar character set corresponding to the character in the second license plate number, the visual similarity of characters for reasonably describing the dissimilar relationship between two characters can be determined as zero. For the case where the first license plate number includes a character within the similar character set corresponding to the character in the second license plate number, the visual similarity of characters may be directly determined according to the sequencing corresponding to the at least one character in the first license plate number within the similar character set, so as to reasonably describe the visual similarity between the two characters.

In addition, a specific method for calculating the visual similarity of characters is provided. Based on the sequencing number of each character and Formula 1, the visual similarity between the two characters can be obtained, thereby reasonably describing the visual similarity of the two characters in the form of a value.

In addition, two manners of obtaining the first license plate number are provided, and the license plate number can be obtained by image recognition or manual inputting, thereby providing multiple application paths of the embodiments of the present disclosure.

Figure 4:
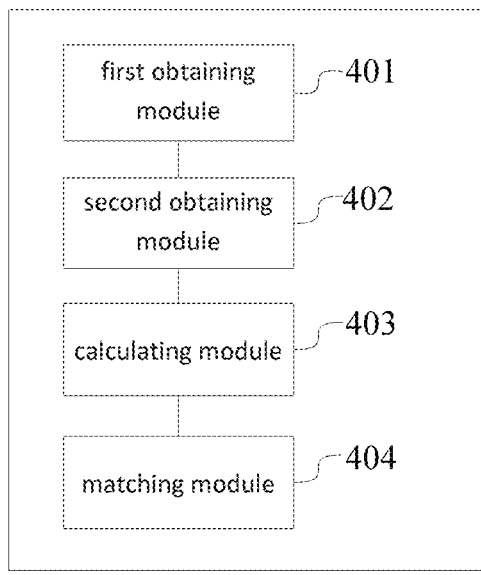
FIG. 4 is a block diagram of a device for matching a license plate number according to examples of the present disclosure.

FIG. 4 is a block diagram of a device for matching a license plate number according to an embodiment of the present disclosure. Referring to FIG. 4, the device specifically includes:

a first obtaining module 401, configured to obtain a first license plate number to be matched;

a second obtaining module 402, configured to obtain a license plate number library, wherein the license plate number library includes at least one second license plate number;

a calculating module 403, configured to calculate a difficult degree in editing a character string required to converting between each second license plate number and the first license plate number according to a visual similarity; and a matching module 404, configured to determine at least one second license plate number as a license plate number matched with the first license plate number based on the difficult degree in editing a character string.

In examples of the present disclosure, the first license plate number is obtained, and then a difficult degree in editing a character string required to convening between each second license plate number and the first license plate number is calculated according to the visual similarity, thereby obtaining a license plate number matched with the first license plate number according to the difficult degree in editing a character string. Due to the image recognition error of the monitoring device, the manual input error of the license plate number, or the like, the wrong license plate number is very visually similar to the original license plate number, therefor the difficult degree in editing a character string obtained according to the visual similarity of characters may reasonably evaluate the similarity between the second license plate number and the first license number. Even if a license plate number recognized is wrong, a license plate number corresponding to the same vehicle may still be obtained successfully, thereby ensuring the effectiveness and rationality of the monitoring function.

In an optional implementing manner, the calculating module 403 includes:

a difficult degree in editing a character calculating sub-module, configured to calculate a difficult degree in editing a character required to converting between each character in each second license plate number and a corresponding character in the first license plate number according to a visual similarity; and a difficult degree in editing a character string calculating sub-module, configured to calculate the difficult degree in editing a character string required to convening between a second license plate number and the first license plate number according to all difficult degrees in editing a character corresponding to all characters in the first license plate number.

In an optional implementing manner, the difficult degree in editing a character is a difficult degree in converting a character in the second license plate number into a corresponding character in the first license plate number.

In an optional implementing manner, the a difficult degree in editing a character calculating sub-module includes:

a character visual similarity obtaining unit, configured to sum difficult degrees in editing all characters in the second license plate number, and taking the sum as the difficult degree in editing a character string.

In an optional implementing manner, the difficult degree in editing a character calculating sub-module includes:

a character visual similarity obtaining unit, configured to obtain the visual similarity of characters between each character in the second license plate number and the corresponding character in the first license plate number; and a difficult degree in editing a character calculating unit, configured to calculate the difficult degree in editing a character required to converting between each character in the second license plate number and the corresponding character in the first license plate number, the difficult degree in editing a character and the obtained visual similarity of characters being the relationship of inverse proportion.

Figure 5:
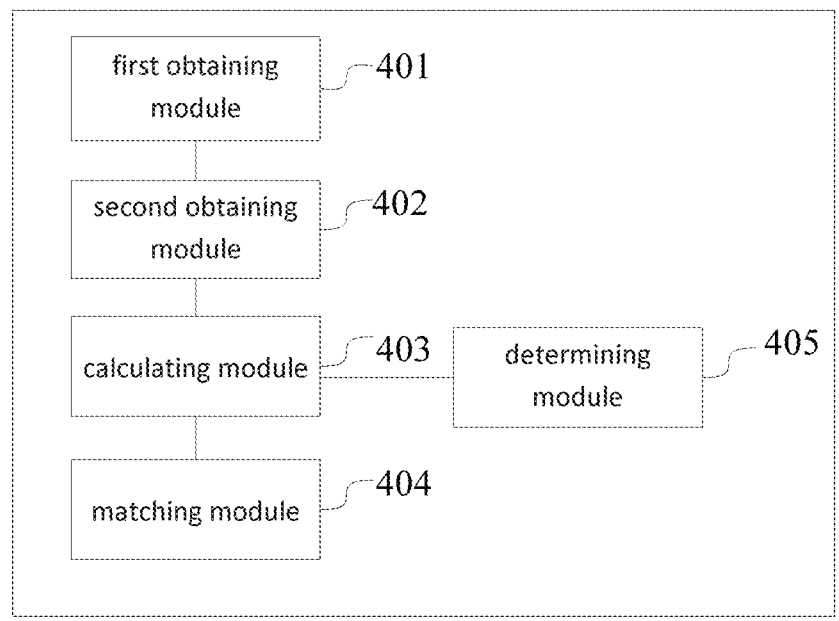
FIG. 5 is a block diagram of a device for matching a license plate number according to examples of the present disclosure.

In an optional implementing manner, based on the device formation of FIG. 4, referring to FIG. 5, the device further includes:

a determining module 405, configured to determine a plurality of similar characters corresponding to each target character, and forming a similar character set of the target character by sorting in a sequence in descending order according to the visual similarity of characters between each of the plurality of similar characters and the target character;

wherein the character visual similarity obtaining unit includes:

a visual similarity of characters obtaining subunit, configured to determine the visual similarity of characters between the character in the second license plate number and the corresponding character in the first license plate number as zero if a corresponding character in the first license plate number is not in the similar character set corresponding to a character in the second license plate number; and a visual similarity of characters determining subunit, configured to determining the visual similarity of characters between the character in the second license plate number and the corresponding character in the first license plate number according to the sorted order of the corresponding character in the first license plate number in the similar character set if a corresponding character in the first license plate number is in the similar character set corresponding to a character in the second license plate number.

In an optional implementing manner, the visual similarity of characters obtaining subunit is further configured to:

determine the visual similarity of characters between the character in the second license plate number and the corresponding character in the first license plate number as zero, if a character in the second license plate number has no corresponding similar character set.

In an optional implementing manner, all similar characters are sorted in a sequence in descending order according to the visual similarity of characters between a similar character and the target character to form a similar character set of the target character;

the character visual similarity obtaining unit includes:

a sequencing number obtaining subunit, configured to obtain a sequencing number of the corresponding character in the first license plate number in the similar character set;

a visual similarity of characters calculating subunit, configured to calculate the visual similarity of characters between the character in the second license plate number and the corresponding character in the first license plate number by Formula 1:

$$\lambda_1 = \frac{n_1 - k_1 + 1}{n_1}, 1 \leq k_1, \qquad \text{Formula 1}$$

wherein, $\lambda_1$ is the visual similarity of characters between the character in the second license plate number and the corresponding character in the first license plate number, $n_1$ is the number of characters in the similar character set, and $k_1$ is the sequencing number of the corresponding character in the first license plate number in the similar character set.

In an optional implementing manner, the second obtaining module 402 includes:

a second querying sub-module, configured to search in a plurality of license plate numbers based on at least one character in the first license plate number; and a second obtaining sub-module, configured to, if a license plate number of the plurality of license plate numbers includes a character the same as at least one character in the first license plate number, then determine the license plate number as a second license plate number in the license plate number library.

In an optional implementing manner, the second obtaining module 402 includes:

a second querying sub-module, configured to search in a plurality of license plate numbers based on at least two consecutive characters in the first license plate number; and a second obtaining sub-module, configured to, if a license plate number of the plurality of license plate numbers includes at least two consecutive characters the same as at least two consecutive characters in the first license plate number, then determine the license plate number as a second license plate number in the license plate number library.

In an optional implementing manner, the first obtaining module 401 is configured to:

obtain the first license plate number by performing image recognition on a captured image; or obtain a first license plate number inputted manually.

In an optional implementing manner, the matching module 404 includes:

a matching sub-module, configured to determine a second license plate number, of which the difficult degree in editing a character string is zero, as a license plate number matched with the first license plate number; or the matching sub-module, configured to, if no second license plate number of which the difficult degree in editing a character string is zero, and the number of designated second license plate numbers, of which the difficult degree in editing a character string is less than a preset threshold, is one, then determine the designated second license plate number as the license plate number matched with the first license plate number; or, a prompting sub-module, configured to, if no second license plate number of which the difficult degree in editing a character string is zero, and the number of designated second license plate numbers, of which the difficult degree in editing a character string is less than a preset threshold, is more than one, then prompting to select one license plate number from the plurality of designated second license plate numbers; and when the selection of a designated second license plate number is received, determining the selected designated second license plate number as the license plate number matched with the first license plate number;

wherein the matching sub-module is configured to, when the selecting operation for any one of the plurality of designated second license plate numbers is received, use the selected designated second license plate number as the license plate number matched with the first license plate number; or the matching sub-module is configured to, if no second license plate number of which the difficult degree in editing a character string is zero, outputting the preset number of second license plate numbers in a second license plate number sequence, which are sorted in a sequence in ascending order according to the difficult degree in editing a character string, as the license plate number matched with the first license plate number.

All of the above optional technical solutions may be used in any combination to form the optional embodiment of the present disclosure, and will not be further repeated herein.

Figure 6:
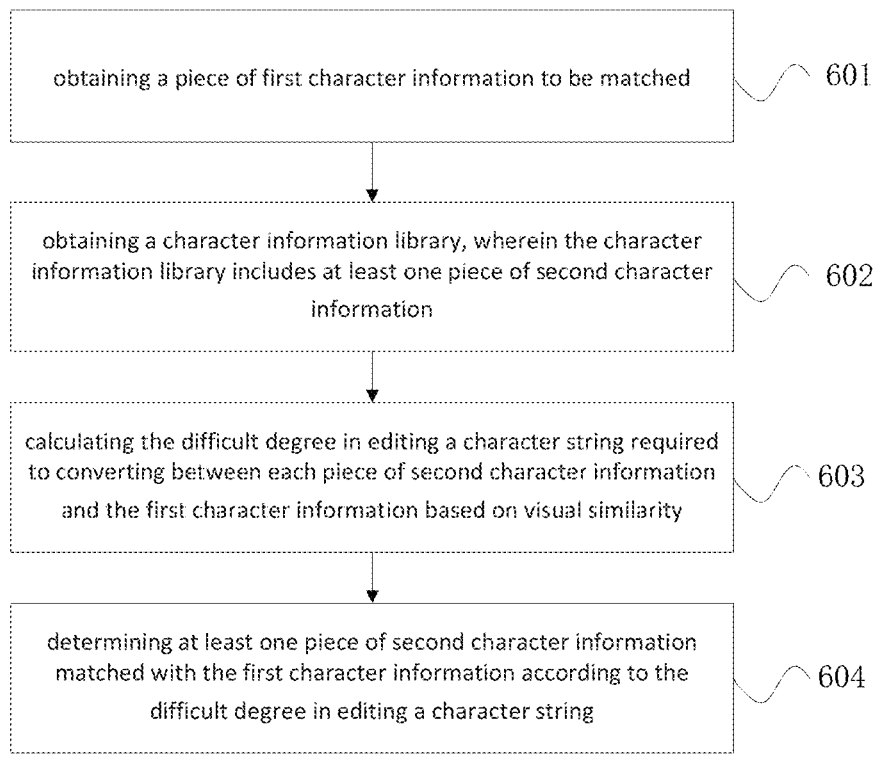
FIG. 6 is a flowchart of a method for matching character information according to examples of the present disclosure.

FIG. 6 is a flowchart of a method for matching character information according to examples of the present disclosure. Referring to FIG. 6, the method includes:

601, obtaining a piece of first character information to be matched;

602, obtaining a character information library, wherein the character information library includes at least one piece of second character information;

603, calculating the difficult degree in editing a character string required to converting between each piece of second character information and the first character information based on a visual similarity; and

604, determining at least one piece of second character information matched with the first character information according to the difficult degree in editing a character string.

In examples of the present disclosure, the first character information is obtained, and the difficult degree in editing a character string required to converting between each piece of second character information and the first character information is calculated according to the visual similarity, thereby obtaining the character information matched with the first character information according to the difficult degree in editing a character string. Due to the image recognition error of the monitoring device, the manual input error of the character information, or the like, the wrong character information is very visually similar to the original character information, so that based on the difficult degree in editing a character string obtained by the visual similarity, the similarity between the second character information and the first character information can be reasonably evaluated. Even if the character information is wrong, the character information similar to the first character information can be successfully matched, thereby ensuring the effectiveness and rationality of the matching.

In an optional implementing manner, wherein the calculating the difficult degree in editing a character string required to converting between each piece of second character information and the first character information based on the visual similarity, includes:

calculating the difficult degree in editing a character required to converting between each character in each piece of second character information and the corresponding character in the first character information based on the visual similarity; and calculating the difficult degree in editing a character string required to converting between the second character information and the first character information according to all difficult degrees in editing a character corresponding to all characters in the first character information.

In an optional implementing manner, the difficult degree in editing a character is a difficult degree in converting a character in the second character information into a corresponding character in the first character information.

In an optional implementing manner, wherein the calculating the difficult degree in editing a character string required to converting between the second character information and the first character information according to all difficult degrees in editing a character corresponding to all characters in the first character information, includes:

summing difficult degrees in editing all characters in the second license plate number, and taking the sum as the difficult degree in editing a character string.

In an optional implementing manner, wherein the calculating the difficult degree in editing a character required to converting between each character in each piece of second character information and the corresponding character in the first character information based on the visual similarity, includes:

obtaining the visual similarity of characters between each character in the second character information and the corresponding character in the first character information; and calculating the difficult degree in editing a character required to converting between each character in the second character information and the corresponding character in the first character information, the difficult degree in editing a character and the obtained visual similarity of characters being the relationship of inverse proportion.

In an optional implementing manner, prior to the calculating a difficult degree in editing a character string required to convening between each second character information and the first character information according to the visual similarity, the method further includes:

determining a plurality of similar characters corresponding to each target character, and forming a similar character set of the target character by sorting in a sequence in descending order according to the visual similarity of characters between each of the plurality of similar characters and the target character;

wherein the obtaining the visual similarity of characters between each character in the second character information and the corresponding character in the first character information, includes:

determining the visual similarity of characters between the character in the second character information and the corresponding character in the first character information as zero if a corresponding character in the first character information is not in the similar character set corresponding to a character in the second character information; and determining the visual similarity of characters between the character in the second character information and the corresponding character in the first character information according to the sorted order of the corresponding character in the first character information in the similar character set if a corresponding character in the first character information is in the similar character set corresponding to a character in the second character information.

In an optional implementing manner, wherein the obtaining the visual similarity of characters between each character in the second character information and the corresponding character in the first character information, includes:

determining the visual similarity of characters between the character in the second character information and the corresponding character in the first character information as zero, if a character in the second character information has no corresponding similar character set.

In an optional implementing manner, the all similar characters are sorted in a sequence in descending order according to the visual similarity of characters between a similar character and the target character to form a similar character set of the target character;

wherein the determining the visual similarity of characters between the character in the second character information and the corresponding character in the first character information according to the sorted order of the corresponding character in the first character information in the similar character set, includes:

obtaining a sequencing number of the corresponding character in the first license plate number in the similar character set;

calculating the visual similarity of characters between the character in the second license plate number and the corresponding character in the first license plate number by $$\lambda_2 = \frac{n_2 - k_2 + 1}{n_2}, 1 \le k_2, \quad \text{Formula 2}$$

wherein, $\lambda_2$ is the visual similarity of characters between the character in the second character information and the corresponding character in the first character information, $n_2$ is the number of characters in the similar character set, and $k_2$ is the sequencing number of the corresponding character in the first character information in the similar character set.

In an optional implementing manner, wherein the obtaining a character information library, includes:

searching in a plurality of pieces of character information based on at least one character in the first character information; and if a piece of character information of the plurality of pieces of character information includes a character the same as at least one character in the first character information, then determining the character information as a second character information in the character information library.

In an optional implementing manner, wherein the obtaining a character information library, includes:

searching in the plurality of pieces of character information based on at least two consecutive characters in the first character information; and if a piece of character information of the plurality of pieces of character information includes at least two consecutive characters the same as at least two consecutive characters in the first character information, then determining the character information as a second character information in the character information library.

In an optional implementing manner, wherein the obtaining the first character information to be matched, includes:

obtaining the first character information by performing image recognition on a captured image; or obtaining a first character information inputted manually.

In an optional implementing manner, wherein the determining at least one piece of character information as the character information matched with the first character information based on the difficult degree in editing a character string, includes:

determining a piece of second character information of which the difficult degree in editing a character string is zero, as the character information matched with the first character information; or if no second character information of which the difficult degree in editing a character string is zero, and the number of designated second character information, of which the difficult degree in editing a character string is less than a preset threshold, is one, then determining the designated second character information as the character information matched with the first character information; or, if no second character information of which the difficult degree in editing a character string is zero, and the number of designated second character information, of which the difficult degree in editing a character string is less than a preset threshold, is more than one, then prompting to select one piece of character information from a plurality of pieces of designated second character information; and when the selection of a designated second character information is received, determining the selected designated second character information as the character information matched with the first character information; or, if no second character information of which the difficult degree in editing a character string is zero, outputting the preset number of second character information in a second character information sequence, which are sorted in a sequence in ascending order according to the difficult degree in editing a character string, as the character information matched with the first character information.

All of the above optional manners may be applied in any combination to form optional examples of the present disclosure, and will not be further repeated herein.

Figure 7:
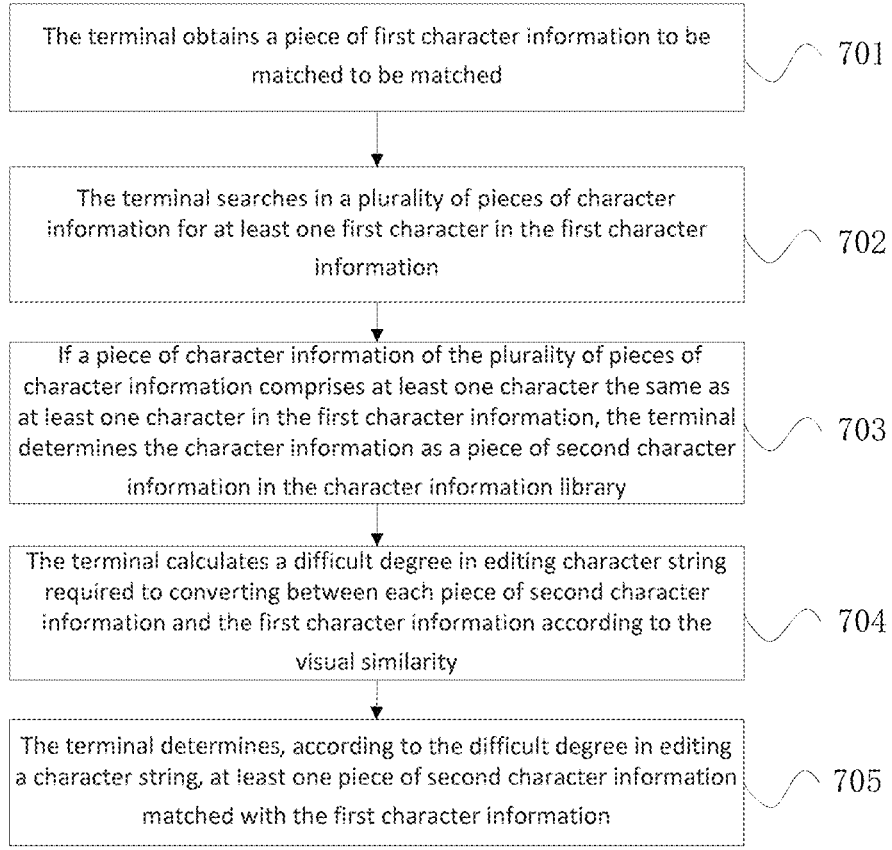
FIG. 7 is a flowchart of a method for matching character information according to examples of the present disclosure.

FIG. 7 is a flowchart of a method for matching character information according to an embodiment of the present disclosure. Referring to FIG. 7, the method can be applied to any electronic device, such as a monitoring device, a terminal, or a server. In addition, the method can be applied to various scenarios based on different pieces of character information. For example, the method can be applied to the scenario for searching a vocabulary or a sentence, and the character information may include words or sentences such as English words or idioms. For another example, the method can be applied to the scenario that match a certificate number, and the character information may be a certificate number such as a student ID number, a card number, or the like. For another example, the method can be applied to the scenario of web search or local search, and the character information may be any character string input by a user. By taking the terminal as an example of the electronic device, the method may include the following steps.

701. The terminal obtains a piece of first character information to be matched to be matched.

The first character information includes at least one character. The examples of the present disclosure do not limit the type of the character. For example, the character may be national language words, punctuations, or the like. The method for obtaining the first character information is not limited to: performing image recognition on a captured image to obtain the first character information; or obtaining the first character information inputted manually. The specific obtaining process is the same as step 201 in principle.

702. The terminal searches in a plurality of pieces of character information based on at least one first character in the first character information.

Each character information of the plurality of pieces of character information is the same as the first character information in principle, but may include a different at least one character. The plurality of pieces of character information may be stored locally in the terminal, or may be stored in a database online, and the terminal may call the plurality of pieces of character information in the database online by network.

The screening method in the query process of such step is the same as step 202 in principle.

703. If a piece of character information of the plurality of pieces of character information comprises at least one character the same as at least one character in the first character information, the terminal determines the character information as a piece of second character information in the character information library.

Such step is the same as step 203 in principle.

704. The terminal calculates a difficult degree in editing character string required to converting between each piece of second character information and the first character information according to the visual similarity.

Such step is similar to step 204 in principle, but the visual similarity of characters between the character in the second character information and the corresponding character in the first character information Formula 2:

$$\lambda_2 = \frac{n_2 - k_2 + 1}{n_2}, 1 \le k_2,$$ Formula 2 wherein $\lambda_2$ is the visual similarity of characters between the character in the second character information and the corresponding character in the first character information, $n_2$ is the number of the characters in the similar character set corresponding to the character in the second character information, and $k_2$ is the sequencing number of the corresponding character in the first character information in the similar character set.

705. The terminal determines, according to the difficult degree in editing a character string, at least one piece of second character information matched with the first character information.

The terminal determines a piece of second character information, matched with the first character information, in the character information library according to difficult degree in editing a character string between each piece of second character information and the first character information. The greater the visual similarity of characters is, the smaller the difficult degree in editing a character string is, and the smaller the difficult degree in editing a character string is, which means that the second character information is more similar to and more matched with the first character information. Based on the matching principle the same as that of the license plate number, the specific manner of determining the matched character information is the same as the specific manner of determining the matched license plate number, and the specific manner can be implemented by only replacing the first license plate number in the steps with the first character information, and replacing the second license plate number with the second character information.

In examples of the present disclosure, the first character information is obtained, and the difficult degree in editing a character string required to converting between each piece of second character information and the first character information is calculated according to the visual similarity, thereby obtaining the character information matched with the first character information according to the difficult degree in editing a character string. Due to the image recognition error of the monitoring device, the manual input error of the character information, or the like, the character information obtained by mistake is very visually similar to the original character information, so that based on the difficult degree in editing a character string obtained by the visual similarity, the similarity between the second character information and the first character information can be reasonably evaluated. Even if the character information is wrong, the character information similar to the same can be successfully matched, thereby ensuring the effectiveness and rationality of the matching.

In addition, based on the principle that the difficult degree in editing a character and the visual similarity of characters are in the relationship of inverse proportion, the difficult degree in editing a character can be calculated based on the visual similarity, and the difficult degree in editing a character string can be obtained by summing all difficult degrees in editing a character corresponding to all characters in the string, thereby providing a specific method to calculate the difficult degree in editing a character string.

In addition, the specific solution of obtaining the visual similarity of characters is provided, for the case where the similar character set is not configured for the character in the second character information, or the corresponding character in the first character information is not in the similar character set corresponding to the character in the second character information, zero can be used as the visual similarity of characters to reasonably describe the dissimilar relationship between two characters. For the case where the first character information is in the similar character set corresponding to the character in the second character information, the visual similarity of characters may be directly determined according to the sequencing corresponding to the similar character set in the first character information, so as to reasonably describe the visual similarity between the two characters.

In addition, a specific method for calculating the visual similarity of characters is provided. Based on the sequencing number of each character and Formula 2, the visual similarity of characters between the two characters can be obtained, thereby reasonably describing the visual similarity of the two characters in the form of a value.

In addition, two manners of obtaining the first character information are provided, and the character information can be obtained by image recognition or manual inputting, thereby providing multiple application paths of the embodiments of the present disclosure.

Figure 8:
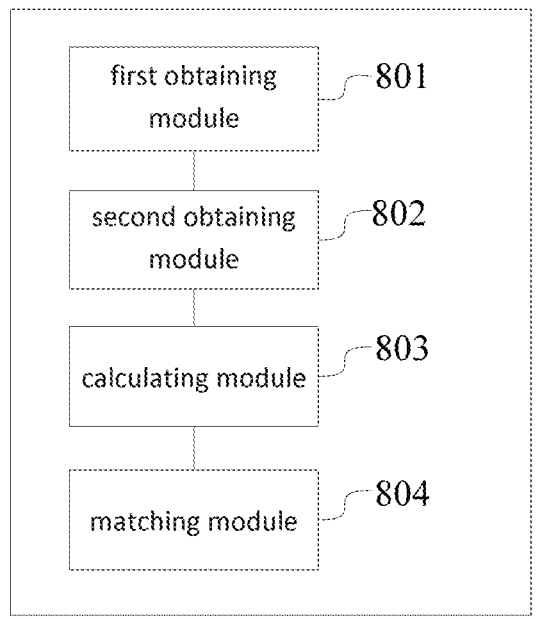
FIG. 8 is a block diagram of a device for matching character information according to examples of the present disclosure.

FIG. 8 is a block diagram of a device for matching character information according to an embodiment of the present disclosure. Referring to FIG. 8, the device specifically includes:

a first obtaining module 801, configured to obtain a piece of first character information to be matched;

a second obtaining module 802, configured to obtain a character information library, wherein the character information library includes at least one piece of second character information;

a calculating module 803, configured to calculate the difficult degree in editing a character string required to converting between each piece of second character information and the first character information based on a visual similarity; and a matching module 804, configured to determine at least one piece of second character information matched with the first character information according to the difficult degree in editing a character string.

In examples of the present disclosure, the first character information is obtained, and the difficult degree in editing a character string required to converting between each piece of second character information and the first character information is calculated according to the visual similarity, thereby obtaining the character information matched with the first character information according to the difficult degree in editing a character string. Due to the image recognition error of the monitoring device, the manual input error of the character information, or the like, the character information obtained by mistake is very visually similar to the original character information, so that based on the difficult degree in editing a character string obtained by the visual similarity, the similarity between the second character information and the first character information can be reasonably evaluated. Even if the character information is wrong, the character information similar to the same can be successfully matched, thereby ensuring the effectiveness and rationality of the matching.

In an optional implementing manner, the calculating module 803 includes:

a difficult degree in editing a character calculating sub-module, configured to calculate the difficult degree in editing a character required to converting between each character in each piece of second character information and the corresponding character in the first character information based on the visual similarity; and a difficult degree in editing a character string calculating sub-module, configured to calculate the difficult degree in editing a character string required to converting between the second character information and the first character information according to all difficult degrees in editing a character corresponding to all characters in the first character information.

In an optional implementing manner, the difficult degree in editing a character is the difficult degree in converting a character in the second character information into a corresponding character in the first character information.

In an optional implementing manner, the difficult degree in editing a character string calculating sub-module is configured to sum difficult degrees in editing all characters in the second license plate number, and taking the sum as the difficult degree in editing a character string In an optional implementing manner, wherein the difficult degree in editing a character calculating sub-module includes:

a character visual similarity obtaining unit, configured to calculate the visual similarity of characters between each character in the second character information and the corresponding character in the first character information; and a difficult degree in editing a character calculating unit, configured to calculate the difficult degree in editing a character required to converting between each character in the second character information and the corresponding character in the first character information, the difficult degree in editing a character and the obtained visual similarity of characters being the relationship of inverse proportion.

Figure 9:
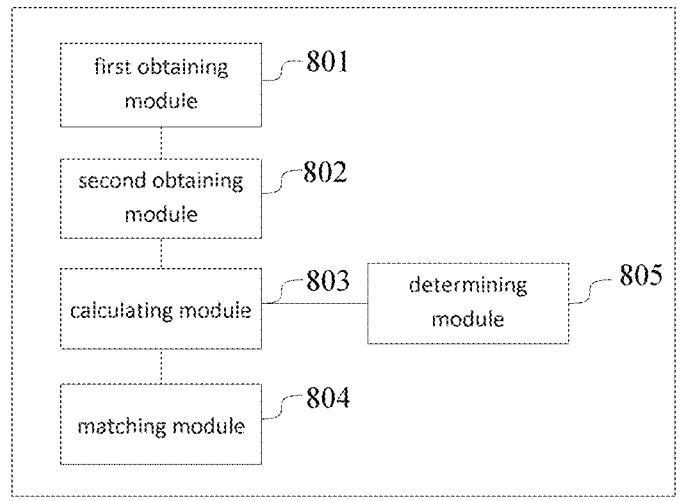
FIG. 9 is a block diagram of a device for matching character information according to examples of the present disclosure.

In an optional implementing manner, based on the device formation of FIG. 8, referring to FIG. 9, the device further includes:

a determining module 805, configured to determine a plurality of similar characters corresponding to each target character, and forming a similar character set of the target character by sorting in a sequence in descending order according to the visual similarity of characters between each of the plurality of similar characters and the target character;

the character visual similarity obtaining unit includes:

a visual similarity of characters obtaining subunit, configured to determine the visual similarity of characters between the character in the second character information and the corresponding character in the first character information as zero if a corresponding character in the first character information is not in the similar character set corresponding to a character in the second character information;

a visual similarity of characters determining subunit, configured to determine the visual similarity of characters between the character in the second character information and the corresponding character in the first character information according to the sorted order of the corresponding character in the first character information in the similar character set if a corresponding character in the first character information is in the similar character set corresponding to a character in the second character information.

In an optional implementing manner, the visual similarity of characters obtaining subunit is further configured to:

determine the visual similarity of characters between the character in the second character information and the corresponding character in the first character information as zero, if a character in the second character information has no corresponding similar character set.

In an optional implementing manner, all similar characters are sorted in a sequence in descending order according to the visual similarity of characters between a similar character and the target character to form a similar character set of the target character;

wherein the character visual similarity obtaining unit includes:

a sequencing number obtaining subunit, configured to obtain a sequencing number of the corresponding character in the first license plate number in the similar character set; and a visual similarity of characters calculating subunit, configured to calculate the visual similarity of characters between the character in the second license plate number and the corresponding character in the first license plate number by Formula 2:

$$\lambda_2 = n_2 - k + 1/n_2, 1 \le k_2, \qquad \text{Formula 2:}$$

wherein, $\lambda_2$ is the visual similarity of characters between the character in the second character information and the corresponding character in the first character information, $n_2$ is the number of characters in the similar character set, and $k_2$ is the sequencing number of the corresponding character in the first character information in the similar character set.

In an optional implementing manner, the second obtaining module 802 includes:

a second searching sub-module, configured to search in a plurality of pieces of character information based on at least one character in the first character information; and a second obtaining sub-module, configured to, if a piece of character information of the plurality of pieces of character information includes a character the same as at least one character in the first character information, then determining the character information as a second character information in the character information library.

In an optional implementing manner, the second obtaining module 802 includes:

a second searching sub-module, configured to search in the plurality of pieces of character information based on at least two consecutive characters in the first character information; and a second obtaining sub-module, configured to, if a piece of character information of the plurality of pieces of character information includes at least two consecutive characters the same as at least two consecutive characters in the first character information, then determining the character information as a second character information in the character information library.

In an optional implementing manner, the first obtaining module 801 is configured to:

obtain the first character information by performing image recognition on a captured image; or obtain a first character information inputted manually.

In an optional implementing manner, the matching module 804 includes:

a matching sub-module, configured to determine a piece of second character information of which the difficult degree in editing a character string is zero, as the character information matched with the first character information; or the matching sub-module, configured to, if no second character information of which the difficult degree in editing a character string is zero, and the number of designated second character information, of which the difficult degree in editing a character string is less than a preset threshold, is one, then determining the designated second character information as the character information matched with the first character information; or, a prompting sub-module, configured to, if no second character information of which the difficult degree in editing a character string is zero, and the number of designated second character information, of which the difficult degree in editing a character string is less than a preset threshold, is more than one, then prompt to select one piece of character information from a plurality of pieces of designated second character information; and the matching sub-module is configured to, when the selection of a designated second character information is received, determining the selected designated second character information as the character information matched with the first character information; or the matching sub-module is configured to, if no second character information of which the difficult degree in editing a character string is zero, outputting the preset number of second character information in a second character information sequence, which are sorted in a sequence in ascending order according to the difficult degree in editing a character string, as the character information matched with the first character information.

All of the above optional manners may be applied in any combination to form optional examples of the present disclosure, and will not be further repeated herein.

It should be noted that, during the license plate number matching process performed by the device for matching the license plate number provided by the above examples, and the character information matching process performed by the device provided by the above examples, the above respective functional modules are divided for illustrated examples. In practical application, the above function assignment can be completed by different functional modules as needed, that is, the internal structure of the device is divided into different functional modules to complete all or part of the functions described above. In addition, the above examples of the device for matching a license plate number and the method for matching a license plate number belong to the same concept, the above examples of the device for matching character information and the method for matching character information also belong to the same concept, and the specific implementing process refers to the method embodiments and is not repeated herein.

Figure 10:
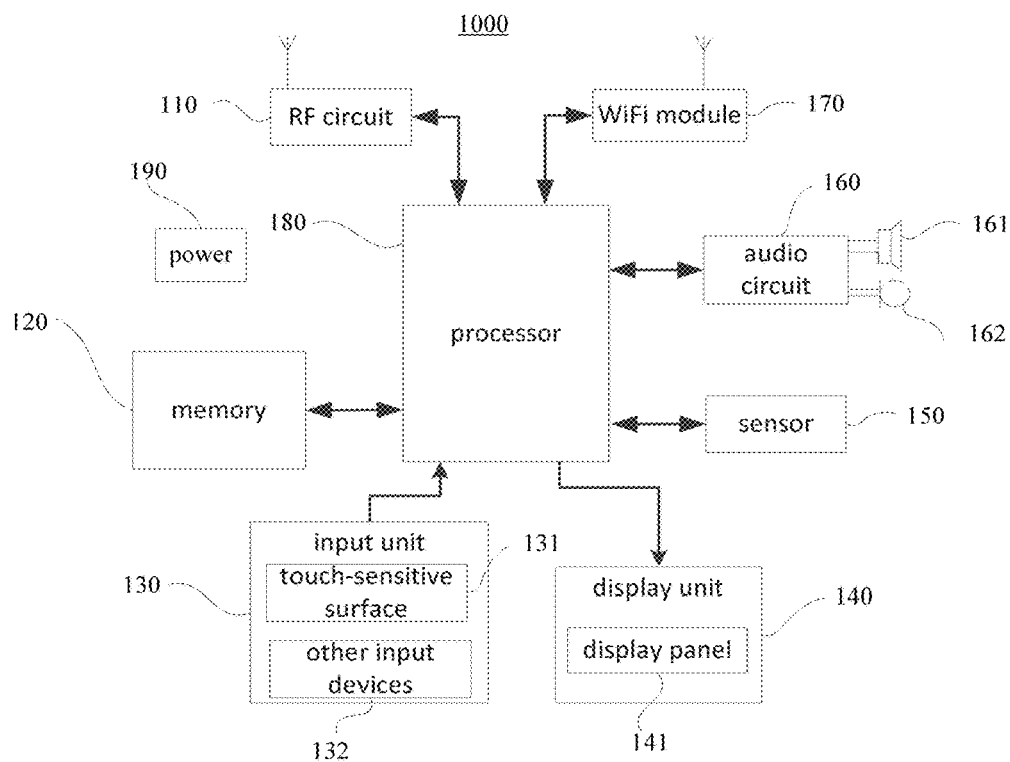
FIG. 10 is a schematic structural diagram of a terminal 1000 according to examples of the present disclosure.

FIG. 10 is a schematic structural diagram of a terminal 1000 according to examples of the present disclosure. Referring to FIG. 10, the terminal 1000 may be configured to perform the method for matching a license plate number or a method for matching character information in the above examples. Referring to FIG. 10, the terminal 1000 may include:

a radio frequency (RF) circuit 110, a memory 120 including one or more computer-readable storage mediums, an input unit 130, a display unit 140, a sensor 150, an audio circuit 160, and a WiFi (Wireless Fidelity) module 170, a processor 180 including one or more processing cores, a power source 190 and the like. It will be understood by those skilled in the art that the terminal structure shown in FIG. 10 does not form limitation to the terminal, and may include more or less components than those illustrated, or combine some components, or have different component arrangements.

The RF circuit 110 may be configured to transmit and receive information or receive and transmit signals during a call. Particularly, after the downlink information of a base station is received, the downlink information is processed by one or more processors 180. In addition, the data related to the uplink is sent to the base station. Generally, the RF circuit 110 includes, but not limited to, an antenna, at least one amplifier, a tuner, one or more oscillators, a subscriber identity module (SIM) card, a transceiver, a coupler, a low noise amplifier (LNA), a duplexer, etc. In addition, the RF circuit 110 may also communicate with the network and other devices via wireless communication. The wireless communication may use any communication standard or protocol, including but not limited to global system of mobile communication (GSM), general packet radio service (GPRS), code division multiple access (CDMA), wideband code division multiple access (WCDMA), long term evolution (LTE), e-mail, short messaging service (SMS), and the like.

The memory 120 may be configured to store software programs and modules, and the processor 180 executes various functional applications and data processing by operating the software programs and modules stored in the memory 120. The memory 120 may mainly include a storage program area and a storage data area, wherein the storage program area may store an operating system, the application program required to at least one function (such as a sound playing function and an image playing function), and the like. The storage data area may store the data created according to the use of the terminal 1000 (such as audio data and phone book) and the like. In addition, the memory 120 may include a high speed random access memory, and may also include a non-volatile memory, such as at least one magnetic disk storage device, a flash memory device, or other volatile solid state storage devices. Correspondingly, the memory 120 may also include a memory controller to provide access of the processor 180 and the input unit 130 to the memory 120.

The input unit 130 may be configured to receive input numeric or character information and to generate keyboard, mouse, joystick, optical or trackball signal inputs related to user settings and function controls. In particular, the input unit 130 may include a touch-sensitive surface 131 as well as other input devices 132. The touch-sensitive surface 131, also referred to as a touch display screen or touch pad, may collect touch operations of the user on or near the touch-sensitive surface (for example, the operation of the user on the touch-sensitive surface 131 or near the touch-sensitive surface 131 with any suitable object or accessory such as a finger and a stylus) and drive the corresponding connecting device according to a preset program. Optionally, the touch-sensitive surface 131 may include two parts of a touch detection device and a touch controller. The touch detection device detects the touch orientation of the user, detects a signal brought by the touch operation, and transmits the signal to the touch controller. The touch controller receives the touch information from the touch detection device, converts the touch information into contact coordinates, sends to the processor 180 and can receive and execute the instructions sent from the processor 180. In addition, the touch-sensitive surface 131 can be implemented in various types such as a resistive type, a capacitive type, an infrared type, and a surface acoustic wave type. In addition to the touch-sensitive surface 131, the input unit 130 may also include other input devices 132. Specifically, other input devices 132 may include, but not limited to, one or more of a physical keyboard, a function key (such as a volume control button and a switch button), a trackball, a mouse and a joystick.

The display unit 140 may be configured to display information input by the user or information provided to the user and various graphical user interfaces of the terminal 1000. These graphical user interfaces can be formed by graphics, texts, icons, videos, and any combination thereof. The display unit 140 may include a display panel 141. Optionally, the display panel 141 may be configured in the form of a liquid crystal display (LCD), an organic light-emitting diode (OLED), or the like. Further, the touch-sensitive surface 131 may cover the display panel 141. When the touch-sensitive surface 131 detects the touch operation thereon or nearby, the touch operation is transmitted to the processor 180 to determine the type of the touch event. Then the processor 180 provides corresponding visual output on the display panel 141 according to the type of the touch event. Although the touch-sensitive surface 131 and the display panel 141 implement the input and output functions as two separate components in FIG. 10, in some embodiments, the touch-sensitive surface 131 may be integrated with the display panel 141 for implementing the input and output functions.

The terminal 1000 may also include at least one sensor 150, for example, a light sensor, a motion sensor, and other sensors. Specifically, the light sensor may include an ambient light sensor and a proximity sensor. The ambient light sensor may adjust the brightness of the display panel 141 according to the brightness of ambient light, and the proximity sensor may close the display panel 141 and/or backlight when the terminal 1000 moves to the ear. As one type of motion sensor, the gravity acceleration sensor can detect the magnitude of acceleration in all directions (usually three axes). When stationary, the gravity acceleration sensor can detect the magnitude and direction of gravity, and can be configured for the application of identifying the posture of a mobile phone (such as horizontal and vertical screen switching, related games and magnetometer posture calibration), vibration recognition related functions (such as a pedometer and tapping), and the like. The terminal 1000 may also be configured with a gyroscope, a barometer, a hygrometer, a thermometer, an infrared sensor and other sensors, which are not repeated here.

The audio circuit 160, the speaker 161, and the microphone 162 may provide audio interfaces between the user and the terminal 1000. The audio circuit 160 may transmit the electrical signal converted from the received audio data to the speaker 161, and the speaker 161 converts the electrical signal to the sound signal and output the same. On the other hand, the microphone 162 converts the collected sound signal into the electrical signal, which is received by the audio circuit 160 and then converted into the audio data. Then the audio data is output to the processor 180 for processing, and is then transmitted to, for example, another terminal by the RF circuit 110. Or the audio data is output to the memory 120 for further processing. The audio circuit 160 may also include an earplug jack to provide communication between peripheral earphones and the terminal 1000.

WiFi is a short-range wireless transmission technology, and the terminal 1000 can help the user to send and receive emails, browse web pages, and access streaming media by the WiFi module 170, thereby providing wireless broadband Internet access for the users. Although FIG. 10 shows the WiFi module 170, it can be understood that the WiFi module 170 does not belong to the essential configuration of the terminal 1000, and may be omitted as needed within the scope of not changing the essence of the disclosure.

The processor 180 is a control center of the terminal 1000 and is connected to various parts of the entire mobile phone with various interfaces and lines, executes various functions and processing data of the terminal 1000 by running or executing the software programs and/or modules stored in the memory 120, and calling the data stored in the memory 120, thereby performing overall monitoring on the mobile phone. Optionally, the processor 180 may include one or more processing cores. Preferably, the processor 180 may integrate an application processor and a modem processor. The application processor mainly processes the operating system, the user interface, the application program, and the like. The modem processor mainly performs wireless communication. It can be understood that the above modem processor may not be integrated into the processor 180.

The terminal 1000 may also include a power source 190 (such as a battery) for powering various components. Preferably, the power source can be logically connected to the processor 180 by a power source management system, so as to manage the functions such as charging, discharging, and power consumption management by the power source management system. The power source 190 may also include one or more of a DC or AC power source, a recharging system, a power source failure detection circuit, a power converter or inverter, a power status indicator, and any other components.

Although not shown, the terminal 1000 may further include a camera, a Bluetooth module, and the like, which are not repeated in detail herein. Specifically, in the present embodiment, the display unit of the terminal is a touch screen display, and the terminal further includes a memory, and one or more than one program. The one or more than one program is stored in the memory and configured to be processed by one or more processor. The one or more than one program includes instructions for performing the following operations: obtaining a first license plate number to be matched; obtaining a license plate number library, wherein the license plate number library includes at least one second license plate number; calculating the difficult degree in editing a character string required to conversion between each second license plate number and the first license plate number based on the visual similarity; and determining at least one second license plate number matched with the first license plate number according to the difficult degree in editing a character string; or obtaining a first piece of character information to be matched; obtaining a character information library, wherein the character information library includes at least one piece of second character information; calculating the difficult degree in editing a character string required to conversion between each piece of second character information and the first character information based on the visual similarity of characters; and determining at least one piece of second character information matched with the first character information according to the difficult degree in editing a character string.

Figure 11:
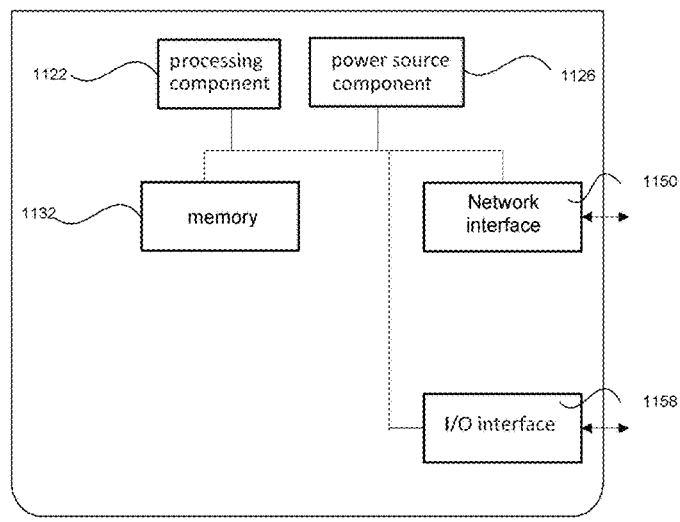
FIG. 11 is a schematic structural diagram of a server according to an embodiment of the present disclosure.

FIG. 11 is a schematic structural diagram of a server according to an embodiment of the present disclosure. Referring to FIG. 11, the server includes a processing component 1122 which further includes one or more processors, and memory resources represented by a memory 1132 for storing instructions executable by the processing component 1122, for example an application program. The application program stored in the memory 1132 may include one or more than one module, each of which corresponds to a set of instructions. Further, the processing component 1122 is configured to execute instructions to perform the above method for matching a license plate number matching method or the method for matching character information.

The server may also include a power source component 1126 configured to perform power source management of the server, a wired or wireless network interface 1150 configured to connect the server to the network, and an input/output (I/O) interface 1158. The server can operate an operating system stored in the memory 1132, such as Windows Server™, Mac OS X™, Unix™, Linux™, FreeBSD™ or the like.

Figure 12:
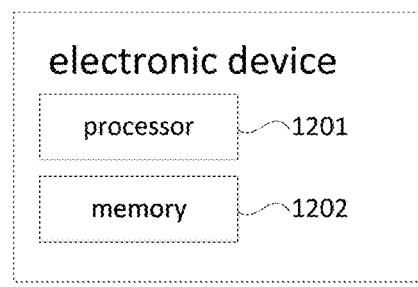
FIG. 12 is a schematic structural diagram of an electronic device according to examples of the present disclosure.

FIG. 12 is a schematic structural diagram of an electronic device according to examples of the present disclosure. The electronic device may be provided as the terminal shown in FIG. 10 or the server shown in FIG. 11. Referring to FIG. 12, the electronic device includes a processor 1201 and a memory 1202. The memory 1202 is configured to store instructions executable by the processor 1201, for example, an application program.

In an application scenario, the above instructions may be loaded by the processor 1201 and execute the following operations:

obtaining a first license plate number to be matched;

obtaining a license plate number library, wherein the license plate number library includes at least one second license plate number, calculating a difficult degree in editing a character string required to converting between each second license plate number and the first license plate number according to a visual similarity of characters; and determining at least one second license plate number as a license plate number matched with the first license plate number based on the difficult degree in editing a character string.

In an optional implementing manner, wherein the calculating a difficult degree in editing a character string required to converting between each second license plate number and the first license plate number according to the visual similarity, includes:

calculating a difficult degree in editing a character required to converting between each character in each second license plate number and a corresponding character in the first license plate number according to the visual similarity of characters; and calculating the difficult degree in editing a character string required to converting between a second license plate number and the first license plate number according to all difficult degrees in editing a character corresponding to all characters in the first license plate number.

In an optional implementing manner, the difficult degree in editing a character is the difficult degree of converting characters in the second license plate number into corresponding characters in the first license plate number.

In an optional implementing manner, the difficult degree in editing a character is a difficult degree in convening a character in the second license plate number into a corresponding character in the first license plate number.

In an optional implementing manner, wherein the calculating the difficult degree in editing a character string required to convening between a second license plate number and the first license plate number according to difficult degrees in editing all characters in a second license plate number according to all difficult degrees in editing a character corresponding to all characters in the first license plate number, includes:

summing difficult degrees in editing all characters in the second license plate number, and taking the sum as the difficult degree in editing a character string.

In an optional implementing manner, wherein the calculating a difficult degree in editing a character required to convening between each character in each second license plate number and a corresponding character in the first license plate number according to the visual similarity of characters, includes:

obtaining the visual similarity between each character in the second license plate number and the corresponding character in the first license plate number; and calculating the difficult degree in editing a character required to converting between each character in the second license plate number and the corresponding character in the first license plate number, the difficult degree in editing a character and the obtained visual similarity of characters being the relationship of inverse proportion.

In an optional implementing manner, prior to the calculating a difficult degree in editing a character string required to converting between each second license plate number and the first license plate number according to the visual similarity of characters, the method further includes:

determining a plurality of similar characters corresponding to each target character, and forming a similar character set of the target character by sorting in a sequence in descending order according to the visual similarity between each of the plurality of similar characters and the target character;

wherein the obtaining the visual similarity between each character in the second license plate number and the corresponding character in the first license plate number, includes:

determining the visual similarity between the character in the second license plate number and the corresponding character in the first license plate number as zero if a corresponding character in the first license plate number is not in the similar character set corresponding to a character in the second license plate number; and determining the visual similarity between the character in the second license plate number and the corresponding character in the first license plate number according to the sorted order of the corresponding character in the first license plate number in the similar character set if a corresponding character in the first license plate number is in the similar character set corresponding to a character in the second license plate number.

In an optional implementing manner, wherein the obtaining the visual similarity between each character in the second license plate number and the corresponding character in the first license plate number, includes:

determining the visual similarity between the character in the second license plate number and the corresponding character in the first license plate number as zero, if a character in the second license plate number has no corresponding similar character set.

In an optional implementing manner, all similar characters are sorted in a sequence in descending order according to the visual similarity between a similar character and the target character to form a similar character set of the target character, and wherein the determining the visual similarity between the character in the second license plate number and the corresponding character in the first license plate number according to the sorted order of the corresponding character in the first license plate number in the similar character set, includes:

obtaining a sequencing number of the corresponding character in the first license plate number in the similar character set;

calculating the visual similarity between the character in the second license plate number and the corresponding character in the first license plate number by Formula 1:

$$\lambda_1 = \frac{n_1 - k_1 + 1}{n_1}, 1 \le k_1,\qquad\text{Formula 1}$$

wherein, $\lambda_1$ is the visual similarity between the character in the second license plate number and the corresponding character in the first license plate number, $n_1$ is the number of characters in the similar character set, and $k_1$ is the sequencing number of the corresponding character in the first license plate number in the similar character set.

In an optional implementing manner, wherein the obtaining a license plate number library, includes:

searching in a plurality of license plate numbers based on at least one character in the first license plate number; and if a license plate number of the plurality of license plate numbers includes a character the same as at least one character in the first license plate number, then determining the license plate number as a second license plate number in the license plate number library.

In an optional implementing manner, wherein the obtaining a license plate number library, includes:

searching in a plurality of license plate numbers based on at least two consecutive characters in the first license plate number; and if a license plate number of the plurality of license plate numbers includes at least two consecutive characters the same as at least two consecutive characters in the first license plate number, then determining the license plate number as a second license plate number in the license plate number library.

In an optional implementing manner, wherein the obtaining the first license plate number to be matched includes:

obtaining the first license plate number by performing image recognition on a captured image; or obtaining a first license plate number inputted manually.

In an optional implementing manner, wherein the determining at least one second license plate number as a license plate number matched with the first license plate number based on the difficult degree in editing a character string, includes:

determining a second license plate number, of which the difficult degree in editing a character string is zero, as a license plate number matched with the first license plate number; or if no second license plate number of which the difficult degree in editing a character string is zero, and the number of designated second license plate numbers, of which the difficult degree in editing a character string is less than a preset threshold, is one, then determining the designated second license plate number as the license plate number matched with the first license plate number; or, if no second license plate number of which the difficult degree in editing a character string is zero, and the number of designated second license plate numbers, of which the difficult degree in editing a character string is less than a preset threshold, is more than one, then prompting to select one license plate number from the plurality of designated second license plate numbers; and when the selection of a designated second license plate number is received, determining the selected designated second license plate number as the license plate number matched with the first license plate number; or, if no second license plate number of which the difficult degree in editing a character string is zero, sorting the second license plate number in a sequence in ascending order according to the difficult degree in editing a character string of each second license plate number, and outputting the preset number of second license plate numbers at the top of a second license plate number sequence as the license plate number matched with the first license plate number.

In another application scenario, the above instructions may be loaded and executed by the processor 1201 to implement the following operations:

obtaining a piece of first character information to be matched;

obtaining a character information library, wherein the character information library includes at least one piece of second character information;

calculating a difficult degree in editing a character string required to convening between each piece of second character information and the first character information based on the visual similarity of characters; and determining at least one piece of second character information matched with the first character information according to the difficult degree in editing a character string.

In examples of the present disclosure, the first character information is obtained, and the difficult degree in editing a character string required to converting between each piece of second character information and the first character information is calculated according to the visual similarity, thereby obtaining the character information matched with the first character information according to the difficult degree in editing a character string. Due to the image recognition error of the monitoring device, the manual input error of the character information, or the like, the wrong character information is very visually similar to the original character information, so that based on the difficult degree in editing a character string obtained by the visual similarity, the similarity between the second character information and the first character information can be reasonably evaluated. Even if the character information is wrong, the character information similar to the first character information can be successfully matched, thereby ensuring the effectiveness and rationality of the matching.

In an optional implementing manner, wherein the calculating the difficult degree in editing a character string required to converting between each piece of second character information and the first character information based on the visual similarity of characters, comprises:

calculating, according to the visual similarity of characters, a difficult degree in editing a character required to converting between each character in each piece of second character information and a corresponding character in the first character information; and calculating, according to difficult degrees in editing all characters in the second character information, a difficult degree in editing a character string required to converting between a pieces of second character information the first character information.

In an optional implementing manner, wherein the difficult degree in editing a character is a difficult degree in converting a character in the second character information into a corresponding character in the first character information.

In an optional implementing manner, wherein the calculating, according to difficult degrees in editing all characters in the second character information, a difficult degree in editing a character string required to converting between a piece of second character information and the first character information, comprises:

summing difficult degrees in editing all characters in the second character information, and taking the sum as the difficult degree in editing a character string.

In an optional implementing manner, wherein calculating, according to the visual similarity of characters, a difficult degree in editing a character required to converting between each character in each piece of second character information and the corresponding character in the first character information, comprises:

obtaining the visual similarity of characters between each character in the second character information and the corresponding character in the first character information; and calculating the difficult degree in editing a character required to converting between each character in the second character information and the corresponding character in the first character information, wherein the difficult degree in editing a character and the obtained visual similarity of characters being the relationship of inverse proportion.

In an optional implementing manner, prior to the calculating the difficult degree in editing a character string required to converting between the second character information and the first character information, the method further comprising:

determining a plurality of similar characters corresponding to each target character, and forming a similar character set of the target character by sorting in a sequence in descending order according to the visual similarity between each of the plurality of similar characters and the target character;

wherein the obtaining the visual similarity between each character in the second character information and the corresponding character in the first character information, comprises:

determining the visual similarity between the character in the second character information and the corresponding character in the first character information as zero, if the corresponding character in the first character information is not in the similar character set corresponding to the character in the second character information; and determining the visual similarity between the character in the second character information and the corresponding character in the first character information according to the sorted order of the corresponding character in the first character information in the similar character set, if the corresponding character in the first character information is in the similar character set corresponding to the character in the second character information.

In an optional implementing manner, wherein the obtaining the visual similarity between each character in the second character information and the corresponding character in the first character information, includes:

determining the visual similarity between the character in the second character information and the corresponding character in the first character information as zero, if a character in the second character information has no corresponding similar character set.

In an optional implementing manner, wherein all similar characters are sorted in a sequence in descending order according to the visual similarity between a similar character and the target character;

wherein the determining the visual similarity between the character in the second character information and the corresponding character in the first character information according to the sorted order of the corresponding character in the character information in the similar character set, comprises:

obtaining a sequencing number of the corresponding character in the first character information in the similar character set;

calculating the visual similarity between the character in the second character information and the corresponding character in the first character information by Formula 2:

$$\lambda_2 = \frac{n_2 - k_2 + 1}{n_2}, \ 1 \le k_2, \qquad \text{Formula 2}$$

wherein, $\lambda_2$ is the visual similarity between the character in the second character information and the corresponding character in the first character information, $n_2$ is the number of characters in the similar character set, and $k_2$ is the sequencing number of the corresponding character in the first character information in the similar character set.

In an optional implementing manner, wherein the obtaining a character information library, includes:

searching in a plurality of pieces of character information based on at least one character in the first character information; and if a piece of character information of the plurality of pieces of character information includes a character the same as the at least one character in the first character information, then determining the character information as a second character information in the character information library.

In an optional implementing manner, wherein the obtaining a character information library, includes:

searching in the plurality of pieces of character information based on at least two consecutive characters in the first character information; and if a piece of character information of the plurality of pieces of character information includes at least two consecutive characters the same as the at least two consecutive characters in the first character information, then determining the character information as the second character information in the character information library.

In an optional implementing manner, wherein the obtaining the first character information to be matched, includes:

obtaining the first character information by performing image recognition on a captured image; or obtaining a first character information inputted manually.

In an optional implementing manner, wherein the determining at least one piece of character information as the character information matched with the first character information based on the difficult degree in editing a character string, includes:

determining a piece of second character information of which the difficult degree in editing a character string is zero, as the character information matched with the first character information; or if no second character information of which the difficult degree in editing a character string is zero, and the number of designated second character information, of which the difficult degree in editing a character string is less than a preset threshold, is one, then determining the designated second character information as the character information matched with the first character information; or, if no second character information of which the difficult degree in editing a character string is zero, and the number of designated second character information, of which the difficult degree in editing a character string is less than a preset threshold, is more than one, then prompting to select one piece of character information from a plurality of pieces of designated second character information; and when the selection of a designated second character information is received, determining the selected designated second character information as the character information matched with the first character information; or, if no second character information of which the difficult degree in editing a character string is zero, sorting the second character information in a sequence in ascending order according to the difficult degree in editing a character string of each piece of second character information, and outputting the preset number pieces of second character information at the top of a second character information sequence as the character information matched with the first character information.

In an exemplary embodiment, there is also provided a computer-readable storage medium, for example a memory including instructions. The above instructions are loaded and executed by a processor to complete the operations executed by the method for matching a license plate number matching method or the method for matching character information in the above embodiments. For example, the computer-readable storage medium can be an ROM, a random access memory (RAM), a CD-ROM, a magnetic tape, a floppy disk, an optical data storage device and the like.

A person skilled in the art could understand that all or part of the steps of implementing the above embodiments may be completed by hardware, or may also be completed by instructing related hardware through a program. The program may be stored in a computer-readable storage medium. The above storage medium may be a read only memory, a magnetic disk, an optical disk, or the like.

The foregoing descriptions are merely optional embodiments of the present disclosure, and are not intended to limit the present disclosure. Within the spirit and principles of the disclosure, any modifications, equivalent substitutions, improvements, etc., are within the protection scope of the present disclosure.

What is claimed is:

1. A method for matching a license plate number, comprising:

obtaining a first license plate number to be matched via performance of image recognition on a captured image;

obtaining a license plate number library, wherein the license plate number library includes at least one second license plate number;

calculating, based on a visual similarity of characters, a difficult degree in editing a character string required to converting between each second license plate number and the first license plate number, wherein calculating the difficult degree comprises:

calculating, according to the visual similarity of characters, one or more first difficult degrees in editing respective characters required to convert between characters in each second license plate number and corresponding characters in the first license plate number, and calculating, according to the first difficult degrees, a second difficult degree in editing a character string required to convert between a second license plate number and the first license plate number, wherein the first difficult degree in editing a character is a difficult degree in converting a character in the second license plate number into a corresponding character in the first license plate number; and determining, according to the difficult degree in editing a character string, at least one second license plate number matched with the first license plate number, wherein the at least one second license plate is configured for output.

2. The method according to claim 1, wherein calculating, based on a visual similarity of characters, a difficult degree in editing a character string required to converting between each second license plate number and the first license plate number, comprises:

summing difficult degrees in editing all characters in the second license plate number, and taking the sum as the difficult degree in editing a character string.

3. The method according to claim 1, wherein the calculating, according to the visual similarity of characters, a difficult degree in editing a character required to converting between each character in each second license plate number and a corresponding character in the first license plate number, comprises:

obtaining the visual similarity of characters between each character in the second license plate number and the corresponding character in the first license plate number; and calculating the difficult degree in editing a character required to converting between each character in the second license plate number and the corresponding character in the first license plate number, wherein the difficult degree in editing a character and the obtained visual similarity of characters being the relationship of inverse proportion.

4. The method according to claim 3, wherein prior to the calculating the difficult degree in editing a character string required to converting between a second license plate number and the first license plate number, the method further comprises:

determining a plurality of similar characters corresponding to each target character, and forming a similar character set of the target character by sorting in a sequence in descending order according to the visual similarity between each of the plurality of similar characters and the target character;

wherein the obtaining the visual similarity between each character in the second license plate number and the corresponding character in the first license plate number, comprises:

determining the visual similarity between the character in the second license plate number and the corresponding character in the first license plate number as zero, if the corresponding character in the first license plate number is not in the similar character set corresponding to the character in the second license plate number;

determining the visual similarity between the character in the second license plate number and the corresponding character in the first license plate number according to the sorted order of the corresponding character in the first license plate number in the similar character set, if the corresponding character in the first license plate number is in the similar character set corresponding to the character in the second license plate number; and determining the visual similarity between the character in the second license plate number and the corresponding character in the first license plate number as zero, if the character in the second license plate number has no corresponding similar character set.

5. The method according to claim 4, wherein all similar characters are sorted in a sequence in descending order according to the visual similarity between a similar character and the target character;

wherein the determining the visual similarity between the character in the second license plate number and the corresponding character in the first license plate number according to the sorted order of the corresponding character in the first license plate number in the similar character set, comprises:

obtaining a sequencing number of the corresponding character in the first license plate number in the similar character set;

calculating the visual similarity between the character in the second license plate number and the corresponding character in the first license plate number by Formula 1:

$$\lambda_1 = \frac{n_1 - k_1 + 1}{n_1}, 1 \le k_1, \quad \text{Formula 1}$$

wherein, $\lambda_1$ is the visual similarity between the character in the second license plate number and the corresponding character in the first license plate number, $n_1$ is the number of characters in the similar character set, and $k_1$ is the sequencing number of the corresponding character in the first license plate number in the similar character set.

6. The method according to claim 1, wherein the obtaining a license plate number library, comprises:

searching in a plurality of license plate numbers based on at least one character in the first license plate number; and if a license plate number of the plurality of license plate numbers includes a character the same as the at least one character in the first license plate number, then determining the license plate number as a second license plate number in the license plate number library; or searching in the plurality of license plate numbers based on at least two consecutive characters in the first license plate number; and if a license plate number of the plurality of license plate numbers includes at least two consecutive characters the same as the at least two consecutive characters in the first license plate number, then determining the license plate number as a second license plate number in the license plate number library.

7. The method according to claim 1, wherein the determining at least one second license plate number as a license plate number matched with the first license plate number based on the difficult degree in editing a character string, comprises:

determining a second license plate number, of which the difficult degree in editing a character string is zero, as a license plate number matched with the first license plate number; or if no second license plate number of which the difficult degree in editing a character string is zero, and the number of designated second license plate numbers, of which the difficult degree in editing a character string is less than a preset threshold, is one, then determining the designated second license plate number as the license plate number matched with the first license plate number; or, if no second license plate number of which the difficult degree in editing a character string is zero, and the number of designated second license plate numbers, of which the difficult degree in editing a character string is less than a preset threshold, is more than one, then prompting to select one license plate number from the plurality of designated second license plate numbers;

and when the selection of a designated second license plate number is received, determining the selected designated second license plate number as the license plate number matched with the first license plate number; or, if no second license plate number of which the difficult degree in editing a character string is zero, sorting the second license plate number in a sequence in ascending order according to the difficult degree in editing a character string of each second license plate number, and outputting the preset number of second license plate numbers at the top of a second license plate number sequence as the license plate number matched with the first license plate number.

8. A method for matching character information, comprising:

obtaining a piece of first character information to be matched via performance of image recognition on a captured image;

obtaining a character information library, wherein the character information library includes at least one piece of second character information;

calculating, based on a visual similarity of characters, a difficult degree in editing a character string required to converting between each piece of second character information and the first character information, wherein calculating the difficult degree comprises:
calculating, according to the visual similarity of characters, one or more first difficult degrees in editing respective characters required to convert between characters in each second license plate number and corresponding characters in the first license plate number, and
calculating, according to the first difficult degrees, a second difficult degree in editing a character string required to convert between a second license plate number and the first license plate number,
wherein the first difficult degree in editing a character is a difficult degree in converting a character in the second license plate number into a corresponding character in the first license plate number; and
determining at least one piece of second character information matched with the first character information according to the difficult degree in editing a character string, wherein the at least one piece of second character information is configured for output.

9. The method according to claim 8, wherein the calculating, according to difficult degrees in editing all characters in the second character information, a difficult degree in editing a character string required to converting between a piece of second character information and the first character information, comprises:
summing difficult degrees in editing all characters in the second character information, and taking the sum as the difficult degree in editing a character string.

10. The method according to claim 8, wherein calculating, according to the visual similarity of characters, a difficult degree in editing a character required to converting between each character in each piece of second character information and the corresponding character in the first character information, comprises:
obtaining the visual similarity of characters between each character in the second character information and the corresponding character in the first character information; and
calculating the difficult degree in editing a character required to converting between each character in the second character information and the corresponding character in the first character information, wherein the difficult degree in editing a character and the obtained visual similarity of characters being the relationship of inverse proportion.

11. The method according to claim 10, wherein prior to the calculating the difficult degree in editing a character string required to converting between the second character information and the first character information, the method further comprises:
determining a plurality of similar characters corresponding to each target character, and forming a similar character set of the target character by sorting in a sequence in descending order according to the visual similarity between each of the plurality of similar characters and the target character;
wherein the obtaining the visual similarity between each character in the second character information and the corresponding character in the first character information, comprises:

determining the visual similarity between the character in the second character information and the corresponding character in the first character information as zero, if the corresponding character in the first character information is not in the similar character set corresponding to the character in the second character information; and
determining the visual similarity between the character in the second character information and the corresponding character in the first character information according to the sorted order of the corresponding character in the first character information in the similar character set, if the corresponding character in the first character information is in the similar character set corresponding to the character in the second character information; and
determining the visual similarity between the character in the second character information and the corresponding character in the first character information as zero, if a character in the second character information has no corresponding similar character set.

12. The method according to claim 11, wherein all similar characters are sorted in a sequence in descending order according to the visual similarity between a similar character and the target character;
wherein the determining the visual similarity between the character in the second character information and the corresponding character in the first character information according to the sorted order of the corresponding character in the character information in the similar character set, comprises:
obtaining a sequencing number of the corresponding character in the first character information in the similar character set; and
calculating the visual similarity between the character in the second character information and the corresponding character in the first character information by Formula 2:

$$\lambda_2 = \frac{n_2 - k_2 + 1}{n_2}, 1 \le k_2, \quad \text{Formula 2}$$

wherein, $\lambda_2$ is the visual similarity between the character in the second character information and the corresponding character in the first character information, $n_2$ is the number of characters in the similar character set, and $k_2$ is the sequencing number of the corresponding character in the first character information in the similar character set.

13. The method according to claim 8, wherein the obtaining a character information library, comprises:
searching in a plurality of pieces of character information based on at least one character in the first character information; and
if a piece of character information of the plurality of pieces of character information includes a character the same as the at least one character in the first character information, then determining the character information as a second character information in the character information library;
or
searching in the plurality of pieces of character information based on at least two consecutive characters in the first character information; and if a piece of character information of the plurality of pieces of character information includes at least two consecutive characters the same as the at least two consecutive characters in the first character information, then determining the character information as the second character information in the character information library.

14. The method according to claim 8, wherein the determining at least one piece of character information as the character information matched with the first character information based on the difficult degree in editing a character string, comprises:
 determining a piece of second character information of which the difficult degree in editing a character string is zero, as the character information matched with the first character information; or
 if no second character information of which the difficult degree in editing a character string is zero, and the number of designated second character information, of which the difficult degree in editing a character string is less than a preset threshold, is one, then determining the designated second character information as the character information matched with the first character information; or
 if no second character information of which the difficult degree in editing a character string is zero, and the number of designated second character information, of which the difficult degree in editing a character string is less than a preset threshold, is more than one, then prompting to select one piece of character information from a plurality of pieces of designated second character information; and when the selection of a designated second character information is received, determining the selected designated second character information as the character information matched with the first character information.

15. An electronic device, comprising: a processor and a memory, wherein the memory stores at least one instruction, and the at least one instruction is configured to be loaded and executed by the processor to implement the operation performed by the method tor matching a license plate number according to claim 1.

16. A non-transitory computer-readable storage medium, wherein the computer-readable storage medium stores at least one instruction, and the at least one instruction is configured to be loaded and executed by a processor to implement the operation performed by the method for matching a license plate number according to claim 1.

* * * * *

UNITED STATES PATENT AND TRADEMARK OFFICE
CERTIFICATE OF CORRECTION

Page 1 of 3

PATENT NO. : 11,093,782 B2
APPLICATION NO. : 16/585552
DATED : August 17, 2021
INVENTOR(S) : Longsheng Hu It is certified that error appears in the above-identified patent and that said Letters Patent is hereby corrected as shown below:

In the Specification

In Column 3, Line 2, delete "convening" and insert --converting--.

In Column 5, Line 15, delete "convening" and insert --converting--.

In Column 5, Line 29, delete "convening" and insert --converting--.

In Column 5, Line 46, delete "convening" and insert --converting--.

In Column 5, Line 53, delete "convening" and insert --converting--.

In Column 6, Line 59, delete "library" and insert --library.--.

In Column 7, Line 4, delete "wherein" and insert --Wherein--.

In Column 7, Line 64, delete "in 1" and insert --in--.

In Column 10, Line 39, delete "number," and insert --number;--.

In Column 11, Line 49, delete "set;" and insert --set.--.

In Column 11, Line 52, delete "number;" and insert --number.--.

In Column 12, Line 67, delete "2," and insert --2.--.

In Column 13, Line 64, delete "a of" and insert --a--.

In Column 15, Line 28, delete "number." and insert --number,--.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 11,093,782 B2

In Column 15, Line 29, delete "the a" and insert --the--.

In Column 15, Line 31, delete "convening" and insert --converting--.

In Column 15, Line 33, delete "convening" and insert --converting--.

In Column 17, Line 51, delete "convening" and insert --converting--.

In Column 18, Line 57, delete "convening" and insert --converting--.

In Column 19, Line 17, delete "convening" and insert --converting--.

In Column 19, Line 26, delete "the a" and insert --the--.

In Column 20, Lines 64-65, after "or" delete "obtain a first license plate number inputted manually." and insert the same in Column 20, Line 65, as new paragraph.

In Column 22, Line 53, delete "convening" and insert --converting--.

In Column 23, Line 38 (Approx.), after "by" insert --Formula 2:--.

In Column 25, Line 35 (Approx.), delete "Formula 2." and insert --may be acquired by using Formula 2.--.

In Column 27, Line 56, delete "string" and insert --string.--.

In Column 28, Line 56, delete "$\lambda_2 = n_2 - k + 1/n_2, 1 \leq k_2,$" and insert --$\lambda_2 = \frac{n_2 - k_2 + 1}{n_2}, 1 \leq k_2,$--.

In Column 33, Line 58, delete "number," and insert --number;--.

In Column 33, Lines 58-61, after "number," delete "calculating a difficult degree in editing a character string required to converting between each second license plate number and the first license plate number according to a visual similarity of characters; and" and insert the same in Column 33, Line 59, as new paragraph.

In Column 34, Line 20, delete "convening" and insert --converting--.

In Column 34, Line 25, delete "convening" and insert --converting--.

In Column 34, Line 36, delete "convening" and insert --converting--.

In Column 35, Line 25, delete "character," and insert --character;--.

In Column 36, Line 53, delete "convening" and insert --converting--.

CERTIFICATE OF CORRECTION (continued)
U.S. Pat. No. 11,093,782 B2

In the Claims

In Column 40, Claim 1, Line 41, after "plate" insert --number--.

In Column 46, Claim 15, Line 16 (Approx.), delete "tor" and insert --for--.